US012215650B2

(12) United States Patent
Hoye et al.

(10) Patent No.: US 12,215,650 B2
(45) Date of Patent: Feb. 4, 2025

(54) CYLINDER HEAD FOR INTERNAL COMBUSTION ENGINE

(71) Applicant: Cummins Inc., Columbus, IN (US)

(72) Inventors: Robert Earl Hoye, Columbus, OH (US); Jeffrey D. Jones, Columbus, IN (US); Daniel J. Mohr, Columbus, IN (US); David M. Barnes, Columbus, OH (US); Timothy Shipp, Seymour, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/596,931

(22) PCT Filed: May 17, 2021

(86) PCT No.: PCT/US2021/032737
§ 371 (c)(1),
(2) Date: Dec. 22, 2021

(87) PCT Pub. No.: WO2022/245329
PCT Pub. Date: Nov. 24, 2022

(65) Prior Publication Data

US 2024/0209810 A1 Jun. 27, 2024

Related U.S. Application Data

(60) Provisional application No. 63/027,604, filed on May 20, 2020.

(51) Int. Cl.
*F02F 1/38* (2006.01)
*F02F 1/40* (2006.01)

(52) U.S. Cl.
CPC . *F02F 1/38* (2013.01); *F02F 1/40* (2013.01)

(58) Field of Classification Search
CPC ........ F02F 1/38; F02F 1/40; F02F 1/26; F02F 1/36; F02F 2001/249
See application file for complete search history.

(56) References Cited

U.S. PATENT DOCUMENTS 4,114,373 A 9/1978 Sakai et al.
5,414,993 A 5/1995 Kon
(Continued)

FOREIGN PATENT DOCUMENTS

CN 201 228 594 Y 4/2009
DE 10 2014 012 503 A1 2/2016
(Continued)

OTHER PUBLICATIONS

International Search Report and Written Opinion, PCT Appln. No. PCT/US2021/032737, Aug. 17, 2021, 9 pgs.
(Continued)

*Primary Examiner* — Jacob M Amick
(74) *Attorney, Agent, or Firm* — Taft Stettinius & Hollister LLP

(57) ABSTRACT

A cylinder head includes novel designs for undercuts, contours of the outer enclosure, coolant jackets, and other cavities within an outer enclosure of the cylinder head. The cylinder head design enables the reduction of weight of the head while maintaining structural integrity of the head, and improves control of temperatures in intake side and exhaust side zones of the heads to improve operational efficiency of the engine. A method is provided for additive manufacturing of the cylinder head including the disclosed designs.

20 Claims, 16 Drawing Sheets

(56) References Cited

U.S. PATENT DOCUMENTS

| | | | |
|---|---|---|---|
| 6,283,081 B1 | 9/2001 | Ozeki | |
| 6,513,506 B1 | 2/2003 | Ito et al. | |
| 6,532,929 B2 | 3/2003 | Antonevich et al. | |
| 8,082,894 B2 | 12/2011 | Poschl et al. | |
| 8,950,374 B2 | 2/2015 | Jones et al. | |
| 9,470,177 B2 | 10/2016 | Jones et al. | |
| 9,964,066 B2 | 5/2018 | Yamamoto et al. | |
| 2005/0115530 A1 | 6/2005 | Gokan | |
| 2008/0083216 A1 | 4/2008 | Claudinon | |
| 2009/0000578 A1 | 1/2009 | Reustle | |
| 2011/0220043 A1 | 9/2011 | Escriva et al. | |
| 2016/0265475 A1 | 9/2016 | Havran et al. | |
| 2019/0048835 A1 | 2/2019 | Brackman et al. | |
| 2019/0218960 A1 | 7/2019 | Wicks et al. | |
| 2020/0040839 A1* | 2/2020 | Barnes | F02F 1/42 |

FOREIGN PATENT DOCUMENTS

| | | |
|---|---|---|
| EP | 1279823 A2 | 1/2003 |
| WO | 2011159528 A2 | 12/2011 |
| WO | 2018/037368 A1 | 3/2018 |
| WO | 2018156682 A1 | 8/2018 |
| WO | 2018212752 A1 | 11/2018 |

OTHER PUBLICATIONS

"European Extended Search Report, EP Appln. No. 21843575.8, Oct. 10, 2023, 14 pgs."

Partial Supplemental European Search Report, EP Appln. No. 21843575.8, Jun. 14, 2023, 13 pgs.

* cited by examiner

CYLINDER HEAD FOR INTERNAL COMBUSTION ENGINE

CROSS-REFERENCE TO RELATED APPLICATIONS

This application is a U.S. National Phase of International PCT Application No. PCT/US21/32737 filed on May 17, 2021, which claims priority under 35 U.S.C. § 119 to U.S. Provisional Patent Application No. 63/027,604 filed May 20, 2020, which are incorporated herein by reference in their entirety for all purposes.

STATEMENT REGARDING FEDERALLY SPONSORED RESEARCH OR DEVELOPMENT

This invention was made with Government support under DE-EE0007761 awarded by DOE. The Government has certain rights in this invention.

TECHNICAL FIELD

The technical field relates to internal combustion engines. More particularly, the field relates to improvements in designs for cylinder beads for internal combustion engines. The internal combustion engines may be engines that use liquid fuels such as diesel fuel or gasoline. Use of other types of suitable liquid fuels or gaseous fuels such as natural gas, or suitable combinations of any of the foregoing, is not precluded.

BACKGROUND

There is a continuing need for improvement in the fuel efficiency of internal combustion engines. An approach to improving fuel efficiency is decreasing the weight of components of an internal combustion engine used to power a vehicle. Conventional cylinder heads typically are designed in a manner that fails to achieve the goal of having a decreased weight, so as to allow for improvement in fuel efficiency of the engines, while also maintaining sufficient structural strength and sealing integrity.

There is also a continuing need for improvement in preventing intake charge air reheat (lower air temperature at IVC), and exhaust heat loss (greater exhaust thermal energy). Benefits of lower charge air temperature in intake air include: reducing the temperature at intake valve closing and improving volumetric efficiency; reducing NOx emission; and improving open cycle efficiency, if considered when sizing air handling. Benefits of increased energy in the exhaust gas include: improving open cycle efficiency and/or increase in air fuel ratio; flexibility in requirements to match of turbo, to be sized to accommodate increased energy; improving aftertreatment performance at low BMEP; and helping transient response through reduced time for engine warm-up.

Thermal barrier coatings, plastic intake sleeves, metal exhaust sleeves, ceramics, and dual-wall (air gap) technologies have all been used to reduce heat transfer in the cylinder head. Thermal barrier coatings alone do not provide a macro-level shift in heat transfer, the sleeves do not target the hottest part of the ports where the most heat transfer occurs, and ceramic can be difficult to use in fabrication of heads. Continued improvements are needed in cylinder head design.

SUMMARY

In embodiments disclosed herein, the cylinder head comprises novel designs for undercuts, contours of the outer enclosure, coolant jackets, and other cavities within an outer enclosure, enabling the reduction of weight of the head while maintaining structural integrity of the head. The designs may employ a jumper tube to improve transfer of heat outside the outer enclosure. The designs help improve control of temperatures in intake side and exhaust side zones of the heads to improve operational efficiency of the engine. The embodiments of the cylinder head described herein reduce unwanted heat transfer from/to the intake, exhaust, and combustion flows in the engine to allow for greater system brake thermal efficiency.

While multiple embodiments are disclosed, still other embodiments of the present invention will become apparent to those skilled in the art from the following detailed description, which shows and describes illustrative embodiments of the invention.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein.

Figure 1:
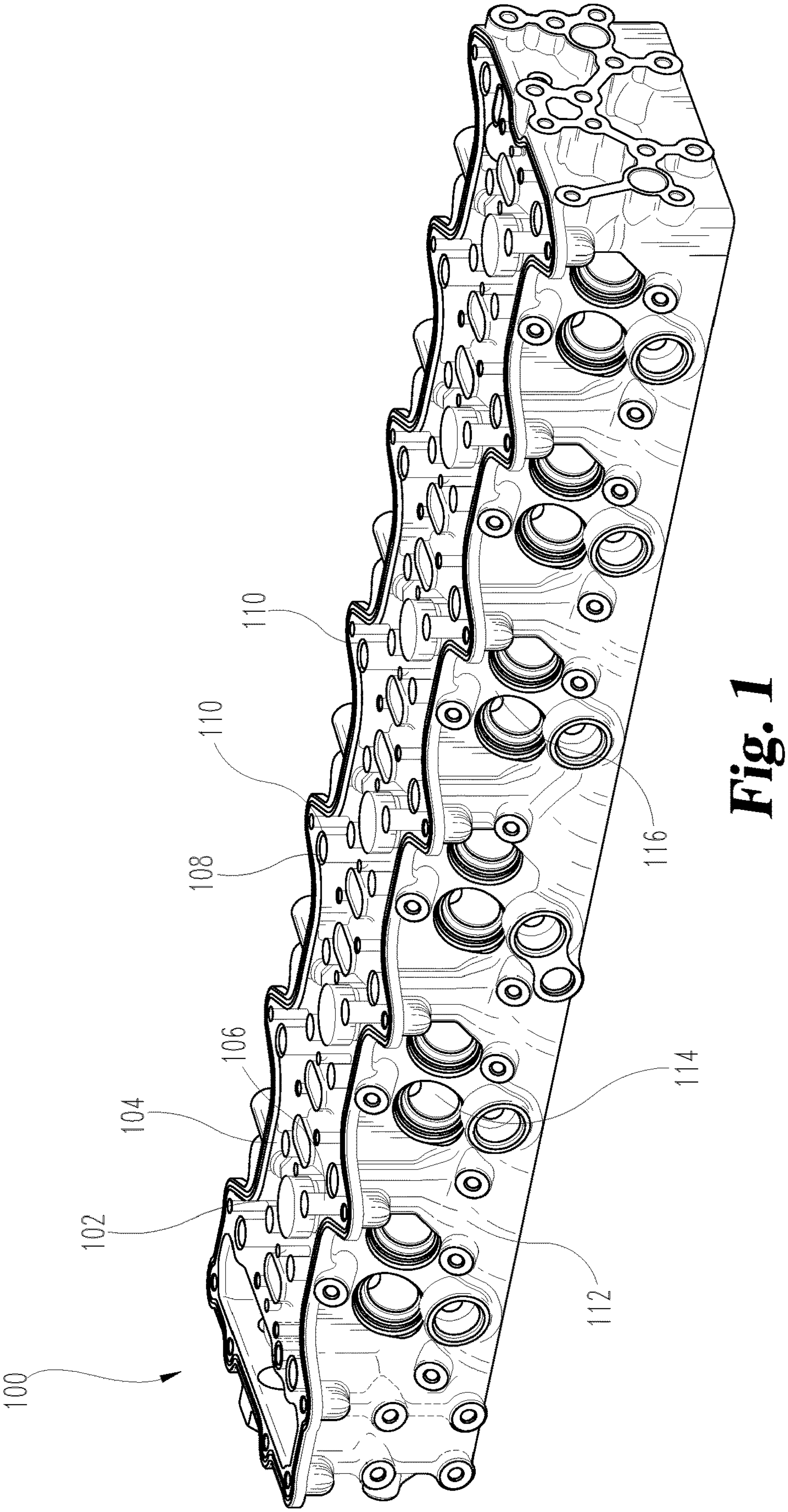
FIG. 1 is an exhaust side perspective view of a portion of an exemplary cylinder head in accord with embodiments of the present disclosure.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the scope of the present invention. Therefore, the following detailed description is not to be taken in a limiting sense, and the scope of the present invention is defined by the appended claims and their equivalents.

FIG. 1 is an exhaust side perspective view of a portion of an exemplary cylinder head in accord with embodiments of the present disclosure. FIG. 1 does not show the upper wall 120 and part of the upper portion of the head; these have been depicted in a translucent form, so as to cut them away to reveal internal structures and bores. The cylinder head may have bores for accommodating insertion of other parts of the engine, including an injector bore 102 which accommodates insertion of a fuel injector positioned to feed a fuel to a combustion chamber formed when the head is affixed to an engine block. The head 100 may be used in engines having a plurality of combustion chambers (typically 2, 4, 6, 8, or 16 chambers, six being shown in the example of FIG. 1), being in the nature of a "slab" type head that covers more than one combustion chamber. However, some of the advantageous inventive features disclosed herein may also be applied to a "unit" type head that is designed to cover one combustion chamber.

Figure 4:
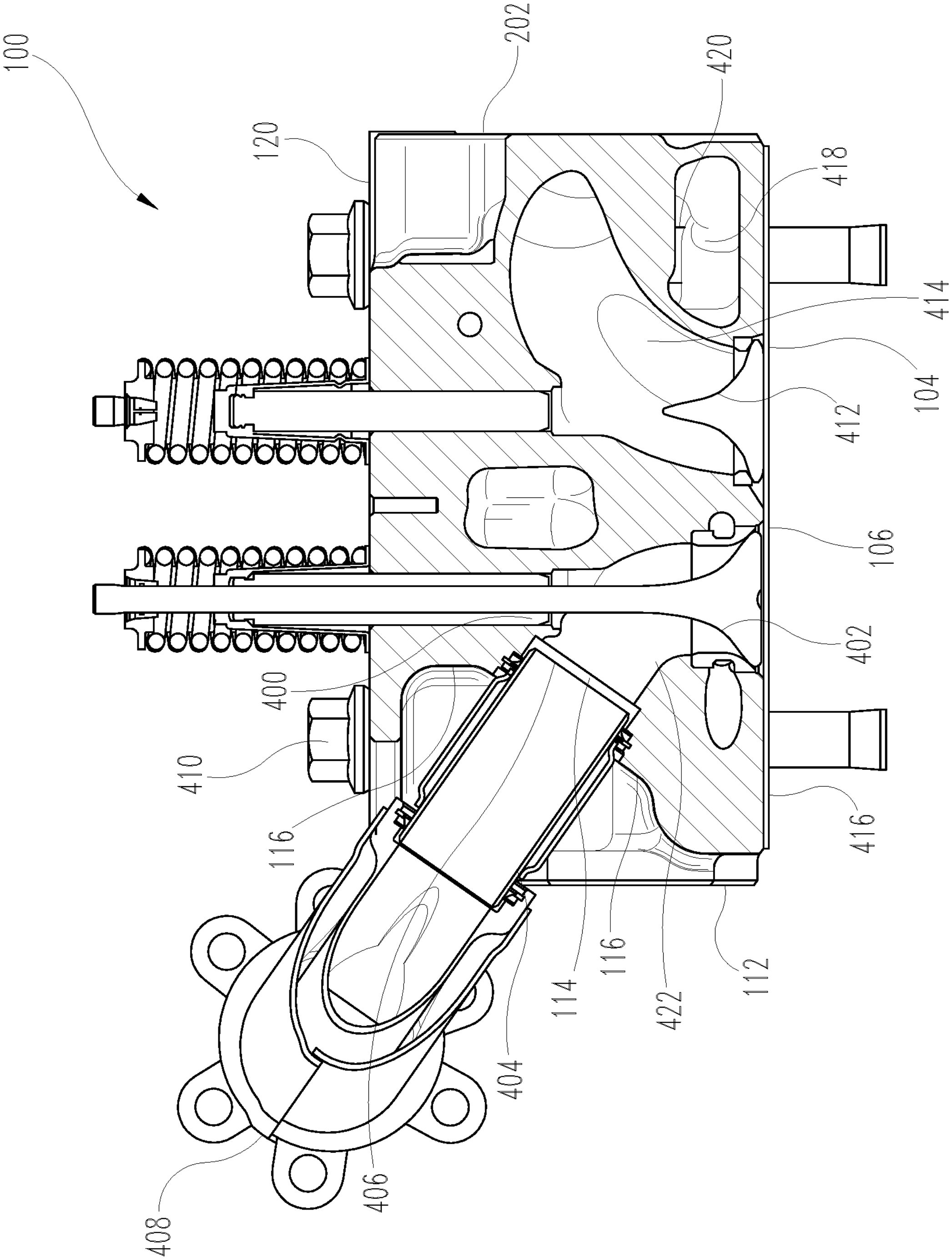
FIG. 4 is a sectional view taken along line IV-IV of FIG. 3 illustrating an embodiment of the cylinder head and attached exhaust jumper tube.

The head includes for each combustion chamber an intake valve seat 104 in the nature of a bore for seating an intake valve 412 (see FIG. 4), and an exhaust valve seat 106 in the nature of a bore for seating an exhaust valve 402 (see FIG. 4). The head comprises a plurality of fastener bores 108 which may be formed in fastener bosses 110 for receiving insertion of a fastener such as a fastener bolt 410 (see FIG. 4) that, in an engaged condition, fastens the cylinder head 100 to the cylinder block of the engine.

As used in this disclosure, "boss" or "bosses" refers to structures that partially or fully surround the fastener bores into which fastener bolts are inserted. The terms "boss" or "bosses" are used herein regardless of whether the structure in question protrudes beyond a surface.

The head 100 has an exhaust side wall 112. The exhaust side wall 112 forms part of an outer enclosure of the body of the head 100, with the other main parts of the outer enclosure being formed by an upper wall 120, a bottom deck side wall 416 configured to be fastened to the engine block, and an intake side wall 202.

As seen in FIG. 1, in an embodiment, the exhaust side wall 112 may include at least one depressed area or recess 116 formed in the exhaust side wall. The recess is positioned adjacent to the exhaust gas outlet 114. As will be seen in other views, the depressed area or recess 116 is configured such that the exhaust gas outlet 114 is disposed adjacent to an exhaust valve guide 400 formed in the cylinder head.

Figure 2:
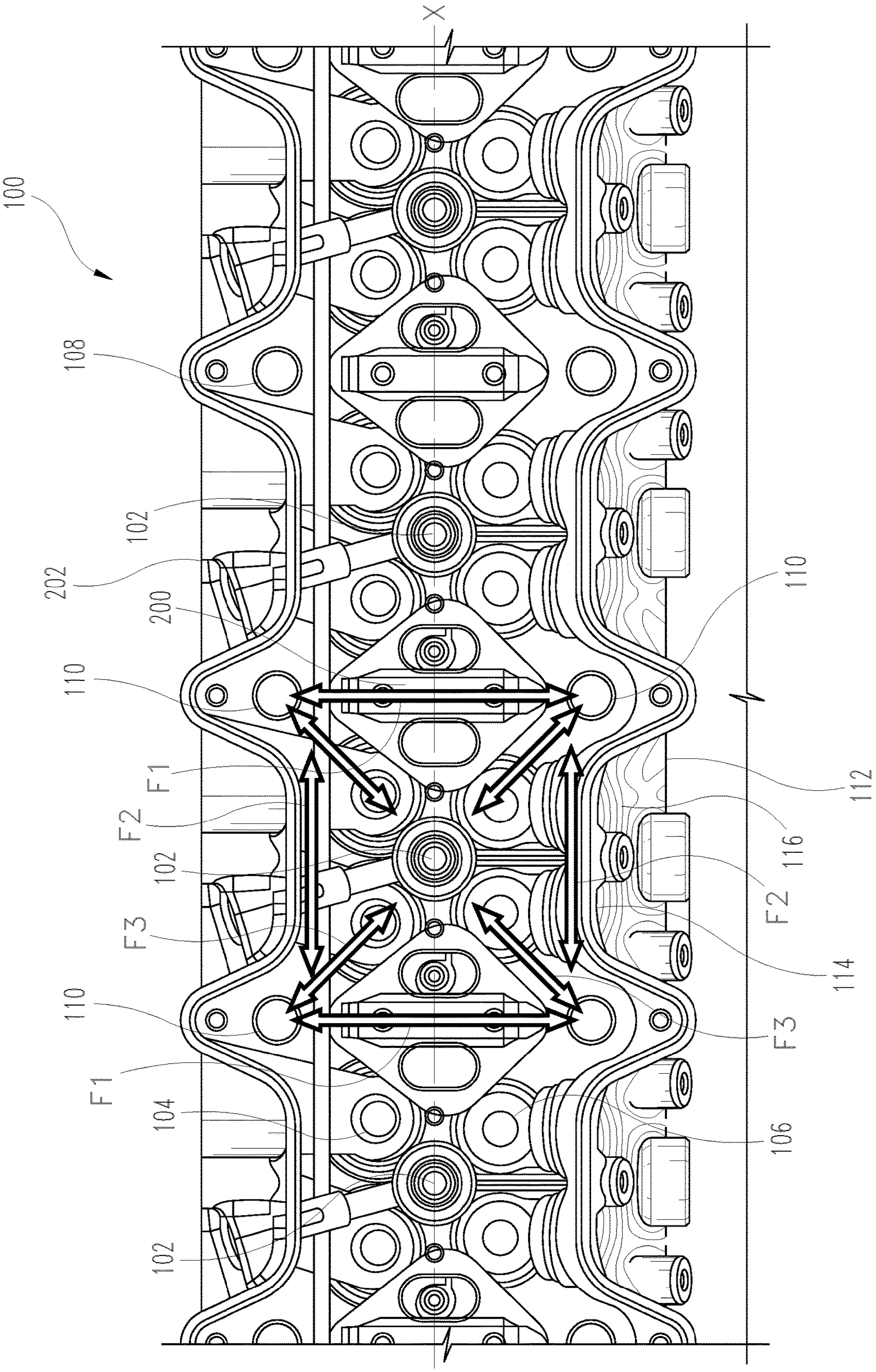
FIG. 2 is a cutaway top view of a portion of an exemplary cylinder head in accord with embodiments of the present disclosure.

FIG. 2 is a cutaway top view of a portion of an exemplary cylinder head in accord with embodiments of this disclosure. FIG. 2 shows a view from above the head 100, and does not show the upper wall 120 and portions of the upper part of the head; these have been cut away to reveal contours of inner bores and structures. Here, viewed from above, an intake side wall 202 of the outer enclosure may be seen. The recess 116 formed in the exhaust side wall 112 may be seen. The recess 116 extends inwardly toward a plane defined by a longitudinal axis X of the head 100, such that the exhaust gas outlet 114 may be formed adjacent to, or as closely as possible to, the exhaust valve guide 400 (see FIG. 4). In this manner, the recess 116 helps to shorten the length of the exhaust gas port 422 (see FIG. 4). This shortening in turn helps to lessen transfer of heat from exhaust gas traveling through the exhaust gas port 422 into the material (metal) forming the head 100.

FIG. 2 shows a series of arrows F1, F2, F3 that represent the location of the principal structural forces exerted by the fastening of fasteners, such as bolts 410, when such are in an engaged position sealing the head 100 to the engine block of an engine. (Optionally, there may be sealing layers interposed between the head and block). For example, an arrows F1, F1 (shown as top-to-bottom arrows in the view of FIG. 2) each extend between two fastener bosses 110, 110 that are both disposed between two adjacent injector bores 102, 102. Each one of the injector bores 102, 102 is disposed over one of two adjacent combustion chambers. Each arrow F1 in this position indicates that when bolts 410 are in the bosses 110 in an engaged condition, a contact pressure balance of sealing forces is shared between fasteners 410 inserted in the two bosses 110, 110 positioned at each end of the arrow F1.

In an embodiment, two fastener bosses, each one disposed between two adjacent combustion chambers in an engaged condition, may comprise boss cutouts formed on the bottom deck side of the two fastener bosses, such that a contact pressure balance of sealing forces is shared between fasteners inserted in the two bosses. The head 100 may comprise a beam formation 200 disposed between the two fastener bosses 110, 110 of the head 100, such that the beam 200 reinforces a head portion positioned between the two fastener bosses 110, 110 referenced in FIG. 2. In FIG. 2, the beam formation 200 may be seen, depicted underneath a force arrow F1. Arrows F2, F2 (shown as left-to-right arrows in FIG. 2) represent the location of structural forces exerted by fastening of fasteners, such as bolts 410, between a respective boss 110 and its neighboring boss 110, each disposed on the respective sides of an injector bore 102 along a longitudinal axis X of the head 100. Arrows F3, F3 (shown as diagonal arrows in FIG. 2) represent the location of structural forces exerted by fastening of fasteners, such as bolts 410, between a respective boss 110 and its respective injector bore 102.

Figure 3:
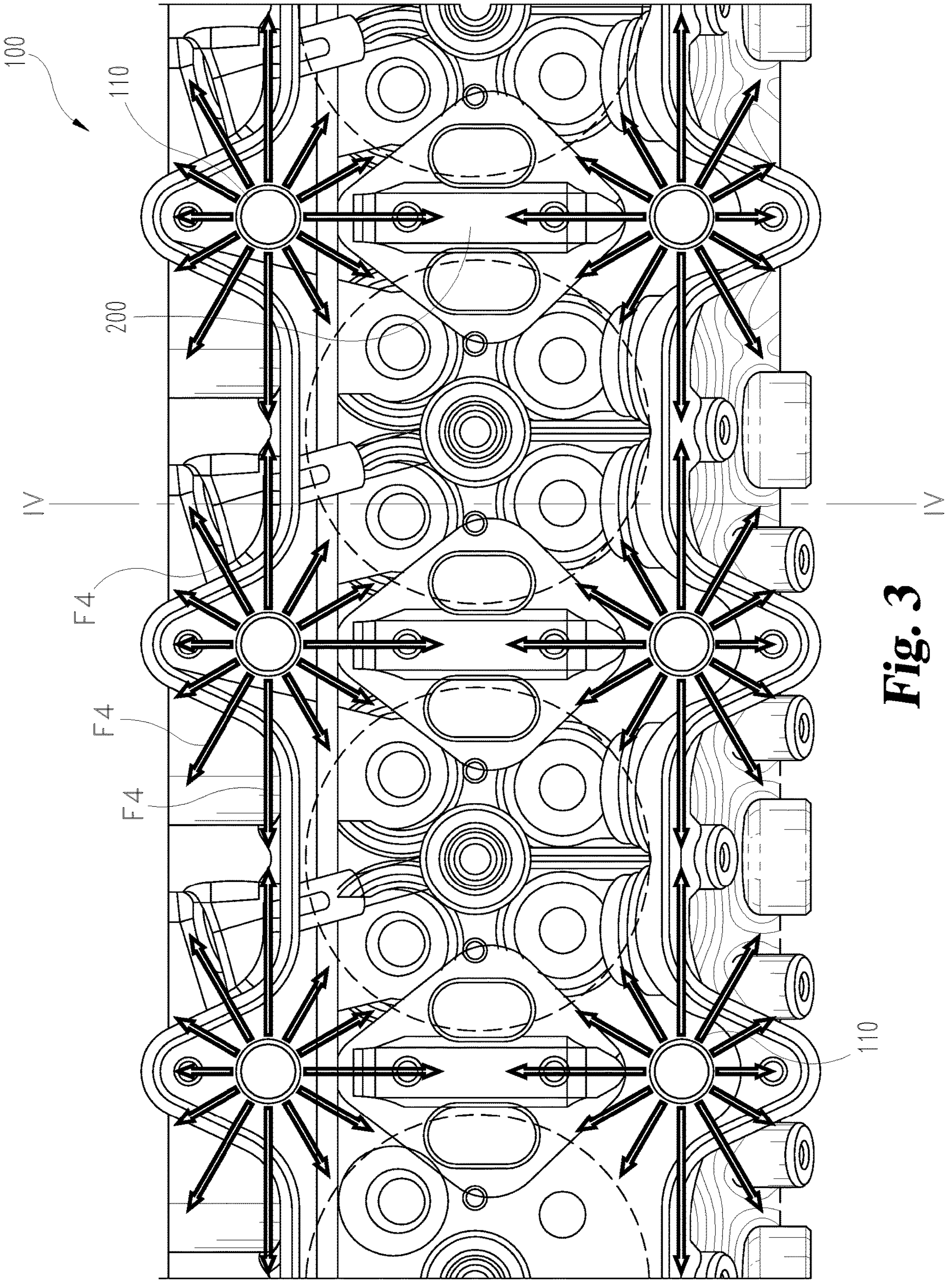
FIG. 3 is a cutaway top view of a portion of an exemplary cylinder head in accord with embodiments of the present disclosure.

FIG. 3 is another cutaway top view of a portion of an exemplary cylinder head in accord with embodiments. As in FIG. 2, FIG. 3 shows a view from above the head 100, and does not show the upper wall 120 and portions of the upper part of the head; these have been cut away to reveal contours of inner bores and structures. FIG. 3 shows with more particularity the location of sealing forces F4, F4 exerted in radial directions by each one of the bolts 410 when such bolt 410 is engaged in its respective boss 110 in order to fasten the head 100 to the block.

FIG. 4 is a sectional view of the head 100 taken along line IV-IV of FIG. 3. FIG. 4 shows an embodiment of the cylinder head 100 with an attached exhaust jumper tube 404. As explained above, the exhaust side wall 112 of the head 100 includes a plurality of depressed areas or recesses 116 extending inwardly to meet with the exhaust gas outlet 114. In this manner, the recesses allow the formation of the exhaust gas outlet 114 at a position that is near, adjacent, and/or as close as possible, to the exhaust valve guide 400 that houses the reciprocating exhaust valve 402. In this manner, the recess 116 helps to shorten the length of the exhaust gas port 422, shortening the distance between the exhaust gas outlet 114 and the exhaust valve seat 106. This shortening helps to lessen transfer of heat from exhaust gas traveling through the exhaust gas port 422 into the material (i.e., metal) forming the head 100. Heat transfer is lessened because less metal is exposed to the hot exhaust gas while the exhaust gas is exiting the head 100 via the exhaust gas outlet 114. Exhaust gas outlet 114 includes means for fluid connection to a proximal end 406 of the jumper tube 404. Jumper tube 404 is configured to extend from the outer enclosure of the head 100, which in this position is defined by the recess 116 in the exhaust side wall 112. Jumper tube 404 extends to a distal end 408 of the jumper tube 404, which is configured to be fluidly connected to an exhaust manifold (not shown) of the engine. The jumper tube 404 may include features such as means for affixing the tube to the exhaust manifold (e.g. bolt holes as shown), and/or means for insulating the jumper tube to limit transfer of heat to ambient outside the jumper tube (such as the jumper tube outer liner shown in FIG. 4).

Also shown in FIG. 4 are a part of an intake valve 412 seated in an intake valve seat 104. The reciprocation of the intake valve controls the entrance of intake charge through intake port or passage 414. Intake charge typically may include one or more of intake air, fuel/air mixtures, and EGR gases. Intake air passage 414 may have an intake air inlet (not shown in FIG. 4) formed in the intake side wall 202 of the head. Head portions of bolts 410 are shown in an engaged condition, having been inserted through the fastener bores 108 in the upper wall 120 in a direction toward the bottom deck side 416 of the head 100. In the example shown in FIG. 4, an undercut in the form of a first boss cutout 418 is formed in an area within the outer enclosure of the head 100, in the vicinity of the bottom deck side 416 of the head 100. A shank portion 420 of fastener bolt 410 is visible in FIG. 4 in the area of the first boss cutout 418.

Figure 5:
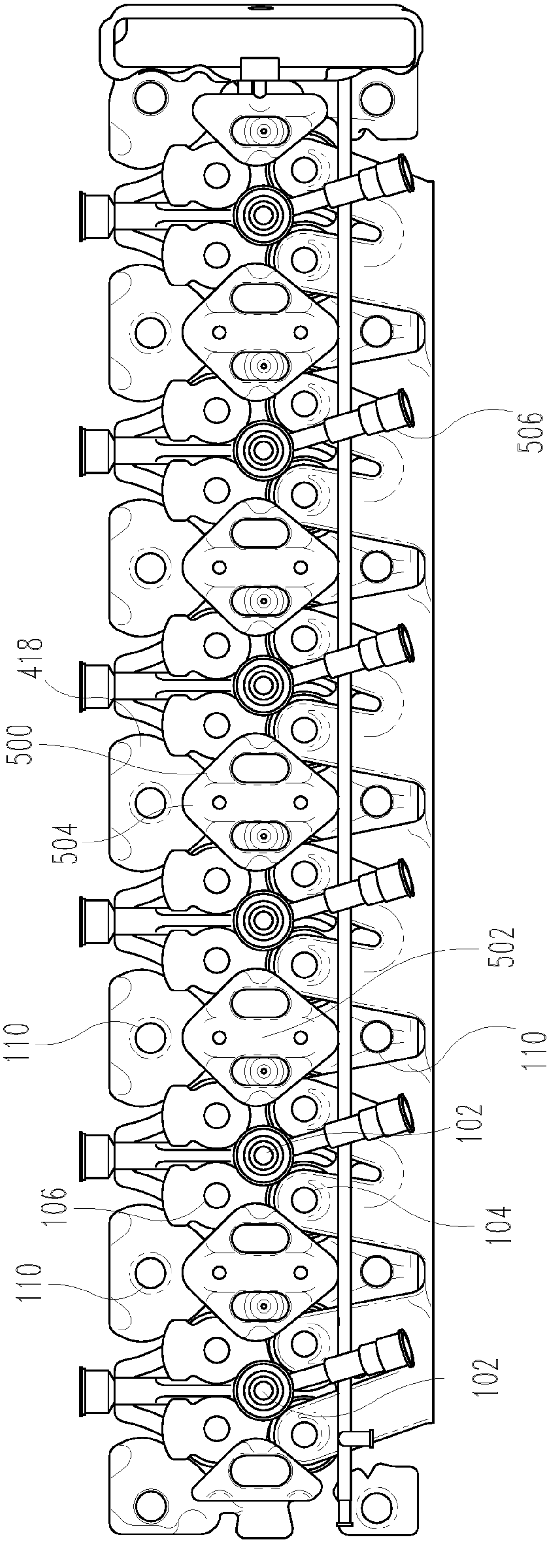
FIG. 5 is a top plan view of a schematic representation of cavities formed in a cylinder head in accord with embodiments of the present disclosure.

Cavities and bores in cylinder heads may be formed by manufacturing methods employing cores or core packs, which are used as molds. The molds define the cavities and bores that are formed within the metal body of a head. FIG. 5 is a top plan view of a schematic representation of the cores or core pack used to manufacture a head 100 according to some embodiments of this disclosure. The view of FIG. 5 is taken from the viewpoint of above the upper wall 120 of the head 100, but the upper wall and all metal constituting the head are not shown, so as to show the contours of cavities that are formed within the head. Thus, the representations of FIG. 5 may depict the outer contours of the cores, and in turn, may represent the outer contours or outer walls of cavities that are formed within the body of a metal cylinder head in accord with embodiments of the present disclosure.

FIG. 5 shows air intake port cores and exhaust port cores. Also shown are parts of cores of a coolant jacket 900 which will be described in more detail below in FIG. 9. Also shown in FIG. 5 is a core for forming a central cavity 500 formed in head 100 between each adjacent pair of the six injector bores 102 formed in the head 100. The position of each injector bore 102 may represent, in this view, the relative position of the combustion chamber that the injector serves. The central cavity 500 is formed within the outer enclosure of the head 100, and is shaped or formed generally in a shape of an inverted pyramid having a parallelogram-shaped upper face 502. The parallelogram may be a diamond shape. The upper face 502 may define an upper wall of the cavity 500. The pyramidal-shaped cavity 500 has an apex 508 (not seen in FIG. 5) may thus be directed toward or is pointing toward the bottom deck side 416 of the cylinder head 100. The central portion of the upper face 502 of the pyramid shaped cavity 500 is disposed at a position that may preferably be equidistant from centerpoints of each of the intake valves 412 and exhaust valves 402 disposed between two adjacent combustion chamber bores of the head.

Also shown in FIG. 5 is a representation of a core for forming an injector cavity 506, formed to accommodate insertion of a fuel injector. As shown, there may be a fuel injector for each of the combustion chambers of the engine, and so FIG. 5 shows a number of injector cavities 506.

As exemplified in the embodiment shown in FIG. 5, a pyramid-shaped cavity 500 between two combustion chamber bores may not be exactly in the form of a classic pyramid with planar sides meeting at sharp corners. Instead the cavity 500 may comprise at least one rounded corner such as rounded corner 504. One or more of the faces of the cavity 500 may have at least one, and in most instances a plurality, of faces that are non-planar. In this example, the upper face 502 is non-planar.

In an embodiment, the head 100 comprises a beam formation disposed above the upper wall (face 502) of the cavity, and disposed between two fastener bosses 110, 110 of the head positioned between two adjacent combustion chamber bores, such that the beam reinforces a head portion that is positioned between the two fastener bosses. In FIG. 5, the beam formation (not shown, because FIG. 5 depicts only cores) would be positioned above the face 502 between bosses 110, 110. This beam position would correspond to the location of the force arrow F between bosses 110, 110 in FIG. 2. An outer contour of first boss cutout 418 is shown in FIG. 5.

Figure 6:
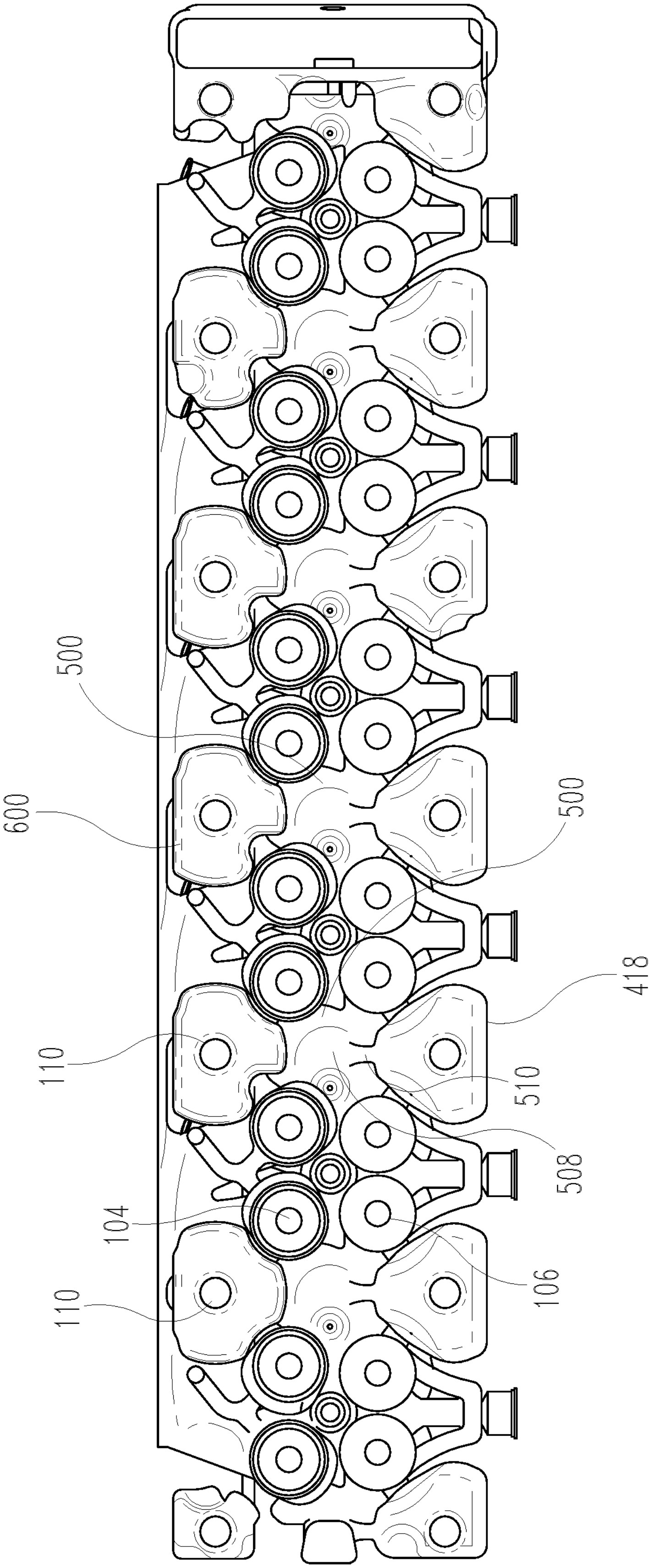
FIG. 6 is a bottom view of the representation of cavities of FIG. 5.

FIG. 6 is a bottom view of the representation of the core pack or cavities of the head of FIG. 5. This view is taken from the perspective of the bottom deck side 416 of the head 100, and so the apex 508 of the inverted pyramid-shaped cavity 500 is depicted. Also shown is a non-planar face portion of the pyramid-shaped cavity. As shown in this view, first boss cutout 418, which corresponds to the first boss cutout 418 previously described with respect to FIGS. 4 and 5, is fluidly connected to the central cavity 500 by an oil passage 510 that allows oil to pass from the cavity 500 to the first boss cutout 418. FIG. 6 shows the bottom wall contours of the first set of boss cutouts 418 as previously described, which are formed on an exhaust side of the head 100. Also shown in FIG. 6 are a second set of boss cutouts 600 which are formed in the region of the intake side of the head.

Figure 7:
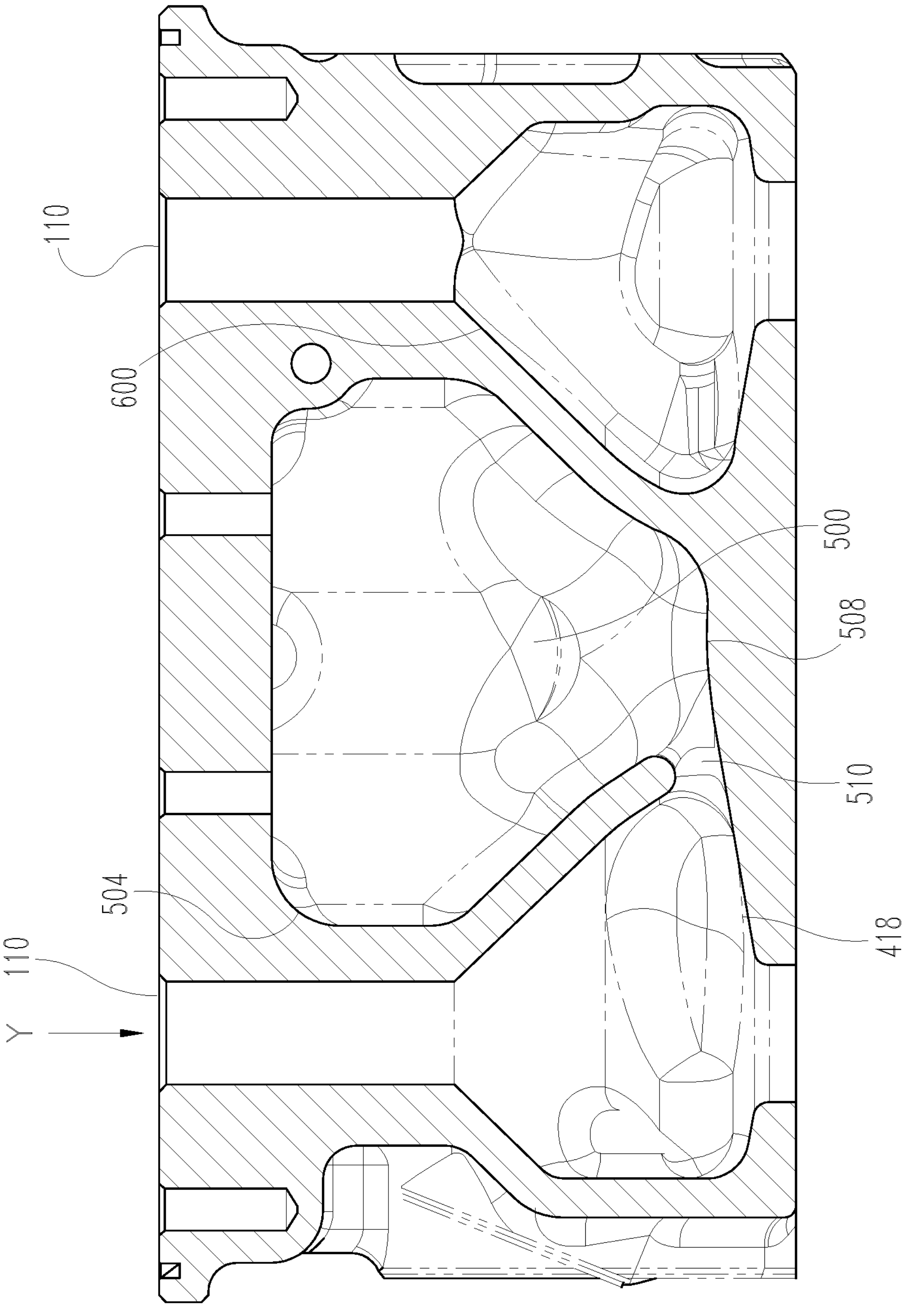
FIG. 7 is a side partial cross sectional view showing a schematic representation of selected cavities formed in a cylinder head in accord with embodiments of the present disclosure.

FIG. 7 is a partial cross sectional view of the head 100, taken from a lateral side of the head, showing a schematic representation of the contours of cavities formed in the head in accord with embodiments. Here, the configuration of first boss cutout 418 is shown with its connecting oil passage 510, permitting fluid connection to the central cavity 500 to allow for drain of oil between the central cavity 500 and the first boss cutout 418. Also shown is second boss cutout 600. In an embodiment, second boss cutout 600 is formed in the fastener boss 110 in a position near the bottom deck side 416 of the head 100. The second boss cutout 600 may define at least a portion, and perhaps all, of an outer wall of a sealed cavity that surrounds a shank portion 420 of the fastener 410 that may be secured within the second boss cutout 600 in the engaged condition. The sealed cavity defined by the second boss cutout 600 may contain air. The arrow Y shows the direction of insertion of a bolt 410 (see FIG. 4) into the boss 110 toward the bottom deck side 416 (see FIG. 4) of the head to engage the head with the block.

Figure 8:
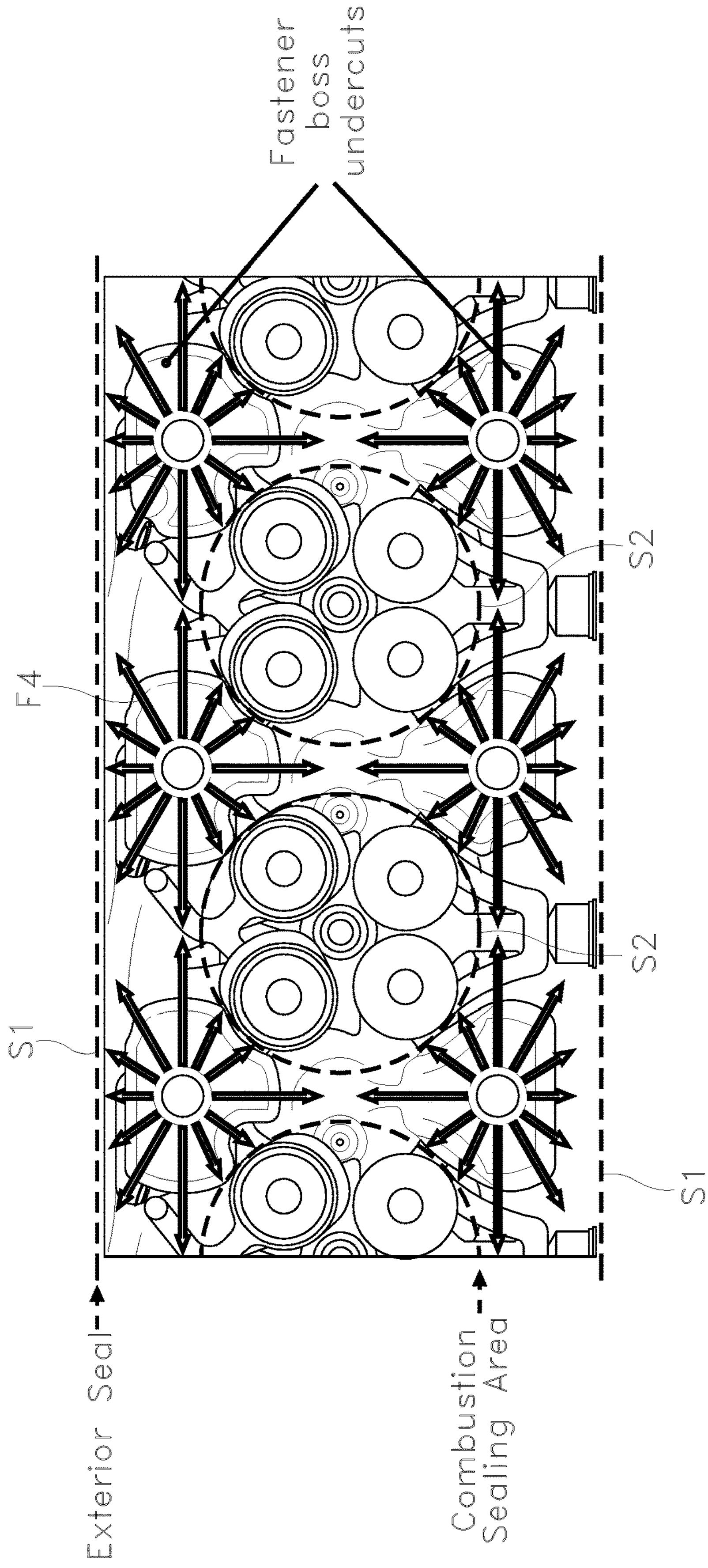
FIG. 8 is an enlarged portion of the view of FIG. 6 with lines indicating sealing regions and force arrows.

FIG. 8 is an enlarged portion of the view of FIG. 6 with lines indicating sealing regions and force arrows. In particular, the arrows correspond to the force arrows F4, F4 of FIG. 3 imposed on a bottom view of the core pack configuration. The force arrows F4, F4 indicate forces generated by bolts 410 when the bolts are secured in their engaged positions within bosses 110. The inventors have determined the key sealing regions, generally represented by dotted lines S1, S2, as the sealing regions requiring sufficient material (metal) of the body of the head to withstand pressure generated by the combustion forces and maintain structural rigidity and a firm seal between head and block. Dotted lines S1, S1 marked "exterior seal" indicate a sealing region along intake and exhaust sides of the head wherein sufficient sealing is needed to enclose the sealed area between the head and block. Circular dotted lines S2, S2 marked "combustion sealing area" surrounding combustion chambers and their respective intake and exhaust valves each indicate a region wherein sufficient sealing force is needed to tolerate the forces generated by combustion in the respective combustion chamber. Taking advantage of the forces represented by arrows F4, F4, the inventors have designed the cavity configurations represented in the drawing figures in this application. The resulting head configuration provides for formation of the head using the least amounts of metal that are needed for structural rigidity and good seal, thus lowering overall weight of the head while maintaining adequate rigidity.

Figure 9:
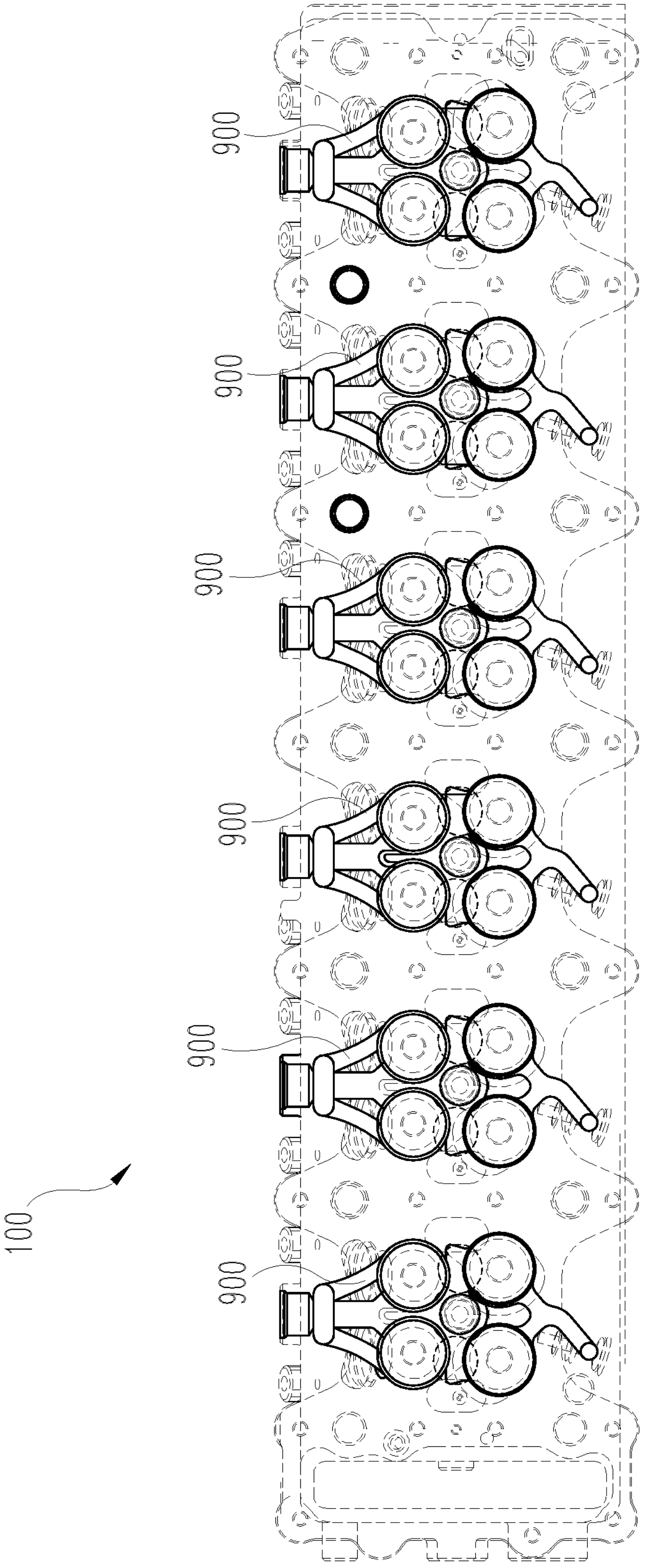
FIG. 9 is a cutaway bottom view of a schematic representation of a coolant jacket formed in a cylinder head in accord with embodiments of the present disclosure.

FIG. 9 is a cutaway bottom view of a schematic representation of the configuration of coolant jackets 900 formed in a cylinder head in accord with embodiments of the present disclosure. Portions of the head are cut away to reveal a shape of the coolant jackets 900. Among the improved features of the configuration of the head in some embodiments is at least one coolant jacket 900, in the nature of an internal cavity or conduit for a coolant such as water to flow through the interior of the head to achieve cooling of selected areas of the head. In FIG. 9, a plurality of coolant jackets 900 is provided, one jacket for each of the six combustion chambers of the exemplary engine as depicted.

Figure 10:
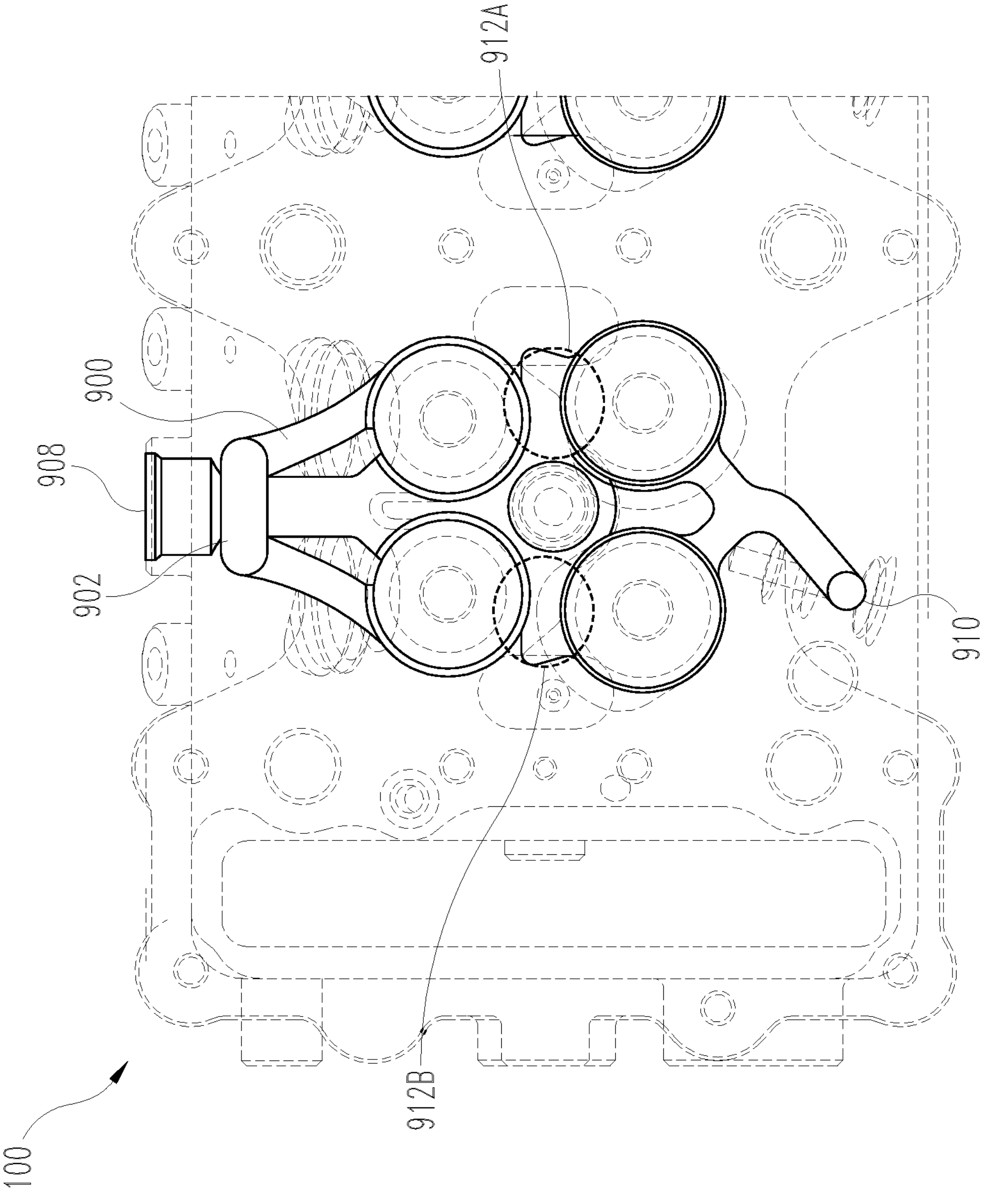
FIG. 10 is an enlarged view of a portion of the view of FIG. 9.

FIG. 10 is an enlarged view of a portion of the view of FIG. 9. In FIG. 10, a coolant outlet 908 of the coolant jacket 900 is positioned on the exhaust side wall 112 of the head 100 for flow of the coolant to an exterior of the head 100. The coolant jacket 900 includes two coolant inlets, a first exhaust side coolant inlet 902 positioned on the exhaust side wall 112 of the head, and a second inlet, namely an intake side coolant inlet 910 positioned in the region of the intake side of the head. Water or other coolants may be introduced into the two coolant inlets for flow through the conduits to the coolant outlet 908 on the exhaust side. Two regions shown in the area of the dotted circular lines represent intake-exhaust bridge regions 912A, 912B (hereinafter, I-E bridges), which are regions located between the intake valve seat 104 and the exhaust valve seat 106 of a given combustion chamber on each side of a chamber. It is desirable in many operational conditions to reduce the transfer of heat from the side of the exhaust valve seat to the side of the intake valve seat. All parts of the jacket 900 are fluidly connected to one another to conduct flow of coolant from the two coolant inlets to the coolant outlet.

Figure 11:
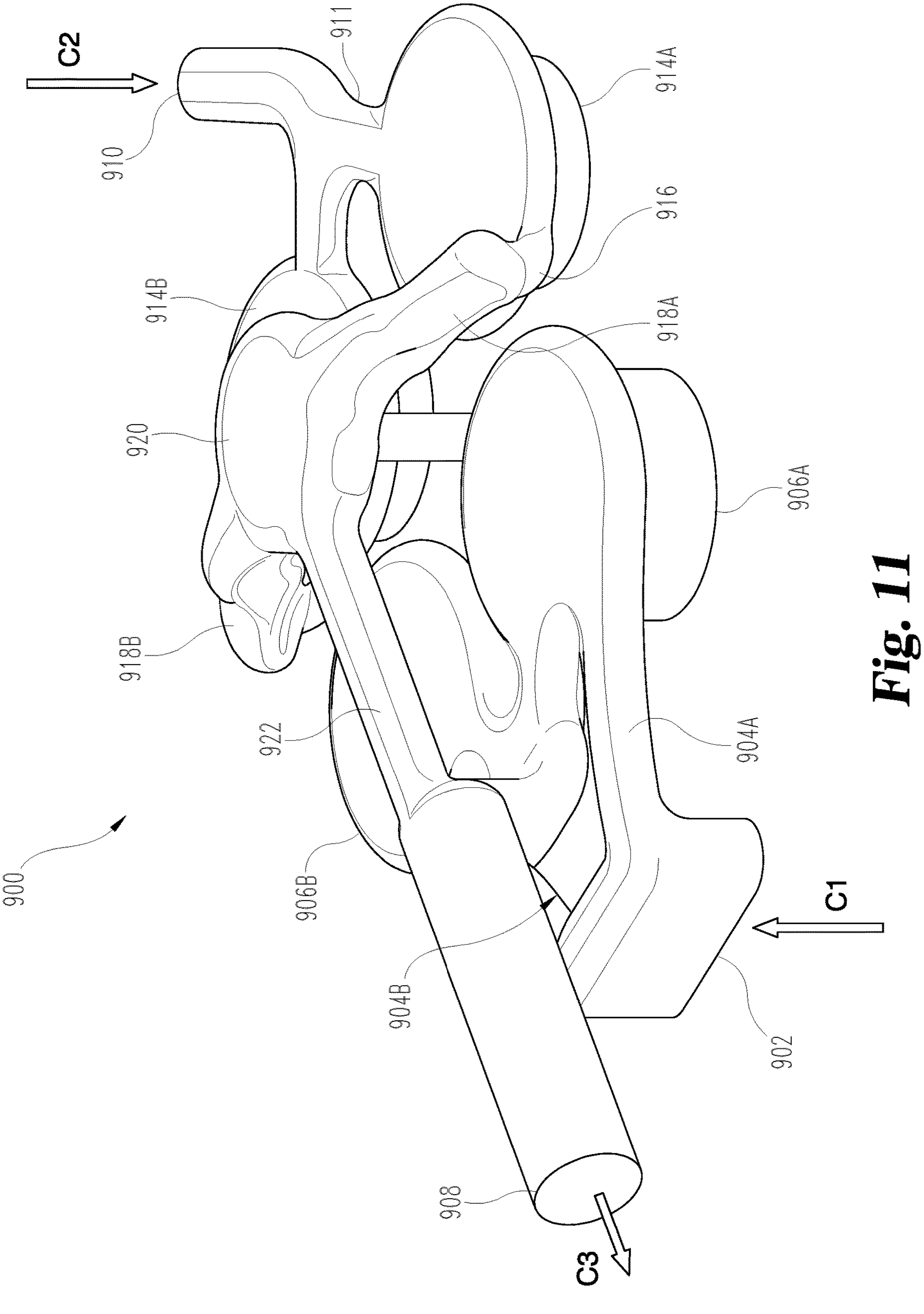
FIG. 11 is a side perspective view of a schematic representation of the coolant jacket of FIG. 9.

FIG. 11 is a side perspective view of a schematic representation of one of the coolant jackets 900 of FIG. 9. Here, the coolant jacket 900 is depicted in a three-dimensional view taken from an oblique angle, and represents the outer contours of a cavity forming the jacket 900. The first inlet, namely the exhaust side coolant inlet 902, is configured to receive intake of a larger portion of the coolant to be circulated through the jacket 900, the parts of which are fluidly connected. The coolant entering exhaust side inlet 902 flows in the direction of arrow C1 into exhaust side passages 904A, 904B, each connected to respective annular exhaust valve seat coolant passages 906A, 906B that each extend along a circumference of each one of the two exhaust valve seats 106, 106. The coolant then flows into an exit passage connected to the exhaust side coolant outlet 908 disposed on an exhaust side of the head. On the intake side of the head 100, coolant is introduced in the direction of arrow C2 into the second inlet, namely intake side coolant inlet 910, and then passes through a forked intake passage 911 that splits the flow to direct it into each of two annular intake valve seat coolant passages 914A, 914B, each of which extends along a circumference of a respective one of the two intake valve seats 104, 104 of the head 100. Coolant exits the annular intake valve seat coolant passages 914A, 914B into respective seat exit passages 916 (only one of the two seat exit passages 916 is visible in FIG. 11). From passages 916, the coolant flows into I-E bridge coolant passages 918A, 918B, which are positioned proximate to or in the vicinity of respective I-E bridges 912A, 912B. From I-E bridge coolant passages 918A, 918B, coolant flows into an annular fuel injector coolant passage 920 extending along a circumference of a seat formed in the head for a fuel injector. Coolant exiting the injector coolant passage 920 enters a connector 922 to then flow out of the head 100 through the exhaust side coolant outlet 908 in the direction of arrow C3.

Figure 12:
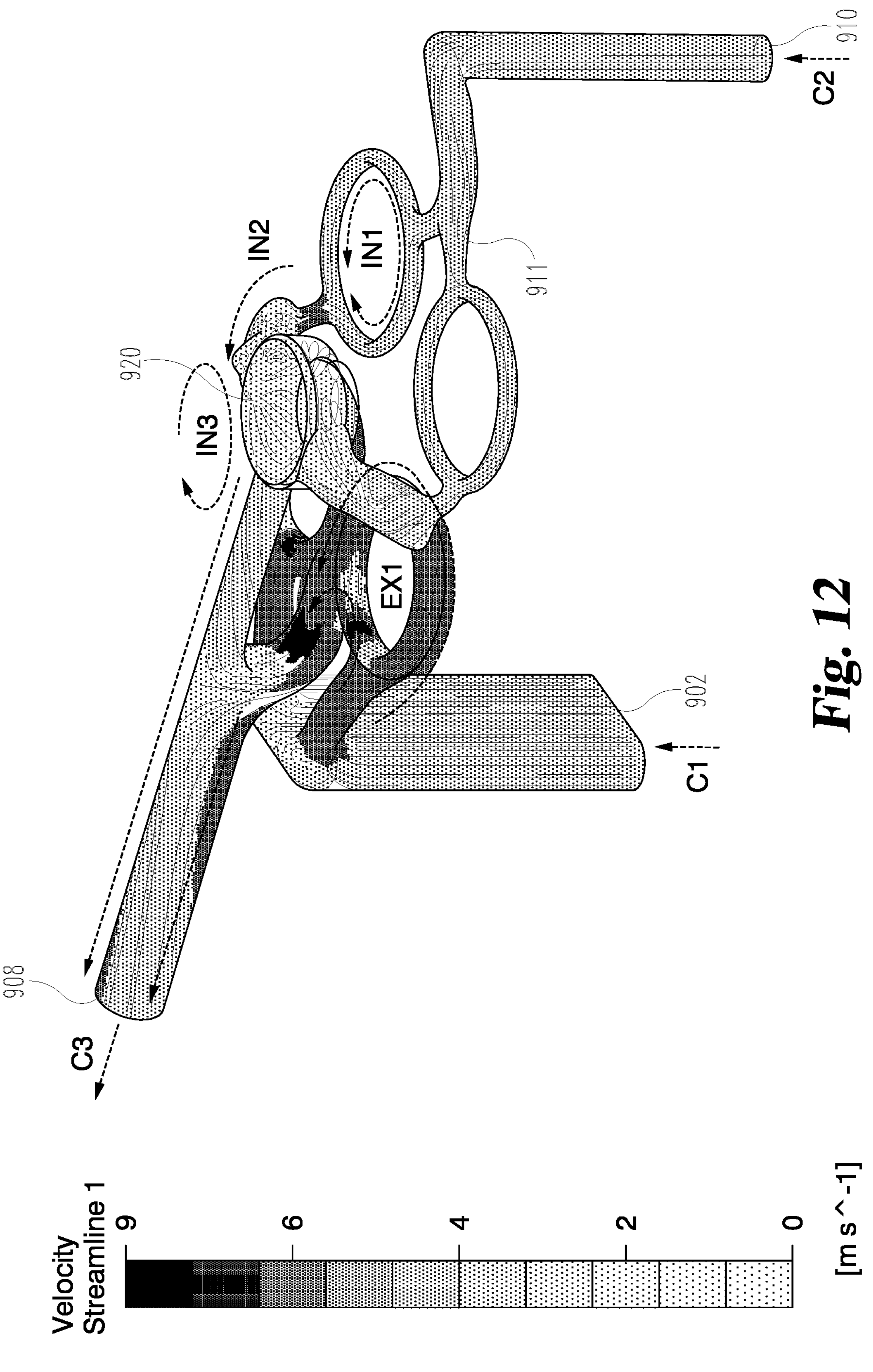
FIG. 12 is a schematic illustration showing direction and velocity of flow of coolant in the coolant jacket of FIG. 9.

FIG. 12 is a schematic illustration showing direction and velocity of flow of coolant in the coolant jacket 900 of FIGS. 9-11. The shaded gradient of FIG. 12 depicts an example of the velocity of flow of coolant through different portions of the jacket 900. In an embodiment, the jacket 900 is configured so that 20% of the incoming coolant flows into the jacket 900 via the intake side coolant inlet 910, and 80% of the incoming coolant flows into the jacket 900 via the exhaust side coolant inlet 902. The incoming coolant flowing in via the intake side coolant inlet 910 may first flow around the intake valve seats to cool the hottest part of the intake ports and intake valves, as depicted by dotted arrow IN1. After flowing around the intake valve seats, the coolant then may flow within the I-E bridge area to arrest exhaust heat transfer to the intake port, as depicted by dotted arrow IN2. The coolant then may flow around the region of the fuel injector to cool fuel temperatures, as depicted by dotted arrow IN3. The incoming coolant flowing in via the exhaust side coolant inlet 902 first may flow around the exhaust valve seats to cool the hottest parts of the exhaust ports and exhaust valves, as depicted by dotted arrow EX1.

Figure 13:
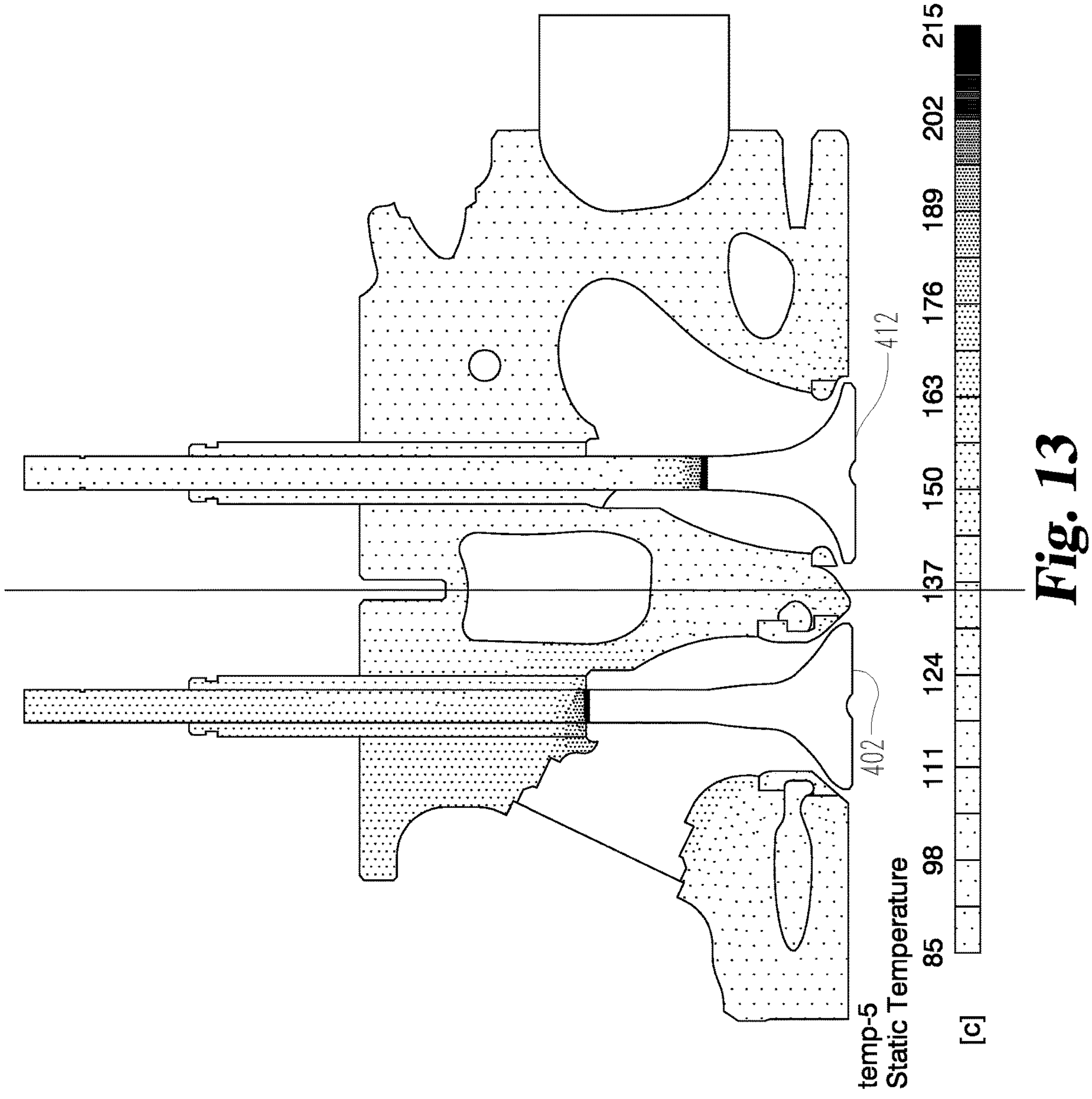
FIG. 13 is a schematic illustration of temperature levels in a cross section of embodiments according to the present disclosure.

FIG. 13 is a schematic illustration showing temperature levels in a cross section of a head 100 according to embodiments having the cavities and coolant jacket as illustrated in the present disclosure. The temperature levels result from operation of the head 100 when configured according to embodiments of this disclosure. The cross sectional view roughly corresponds to the view of FIG. 4, with temperatures in different areas of the cross section represented by gradient shading. As shown in FIG. 13, a benefit of the head 100 as designed by the inventors is that the hot side (exhaust side) of the head 100 is hotter than baseline, which reduces heat transfer from the exhaust gas into the metal of the head 100. This effect, in turn, improves turbocharger efficiency and increases the heat available for use in aftertreatment processes and devices in the exhaust system, and for waste heat recovery. Another benefit of the head as designed is that the cold-side intake port area temperatures are cooler than baseline. This effect reduces the heat transfer from the head to the charge air. In turn, this reduction in heat transfer improves the volumetric efficiency of the operation of the engine.

Figure 14:
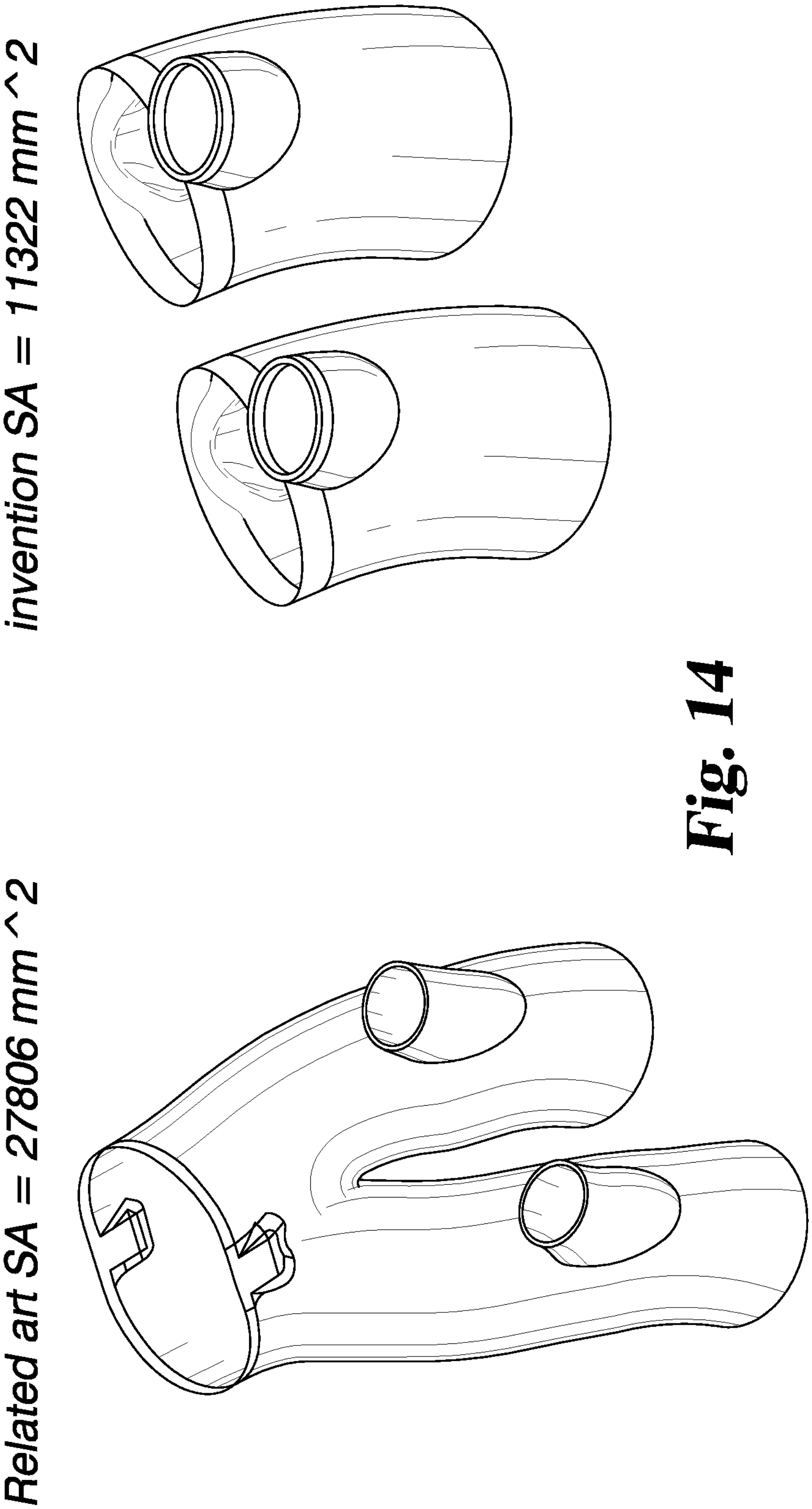
FIG. 14 is a diagram comparing surface area of the exhaust port of FIG. 4 to a related art exhaust port.

FIG. 14 is a diagram comparing surface area of the exhaust port of FIG. 4 to a related art exhaust port. The two exhaust ports of the invention, illustrated on the right side of FIG. 14, generally correspond in shape and configuration to the exhaust port 422 as shown in cross section in FIG. 4. In an exemplary configuration according to the invention, the total surface area SA is 11322 $mm^2$. These exemplary ports in accord with the invention are contrasted with the configuration and surface area dimensions of a related art exhaust port shown on the left side of FIG. 14, which has a surface area of 27806 $mm^2$. Thus, in an example in accord with FIG. 1 having exhaust gas wall recesses 116, which allow reduction of the length of exhaust ports, the inventive exhaust ports may provide approximately a 60% reduction in the surface area of the exhaust ports compared to baseline ports of the related art.

Figure 15A:
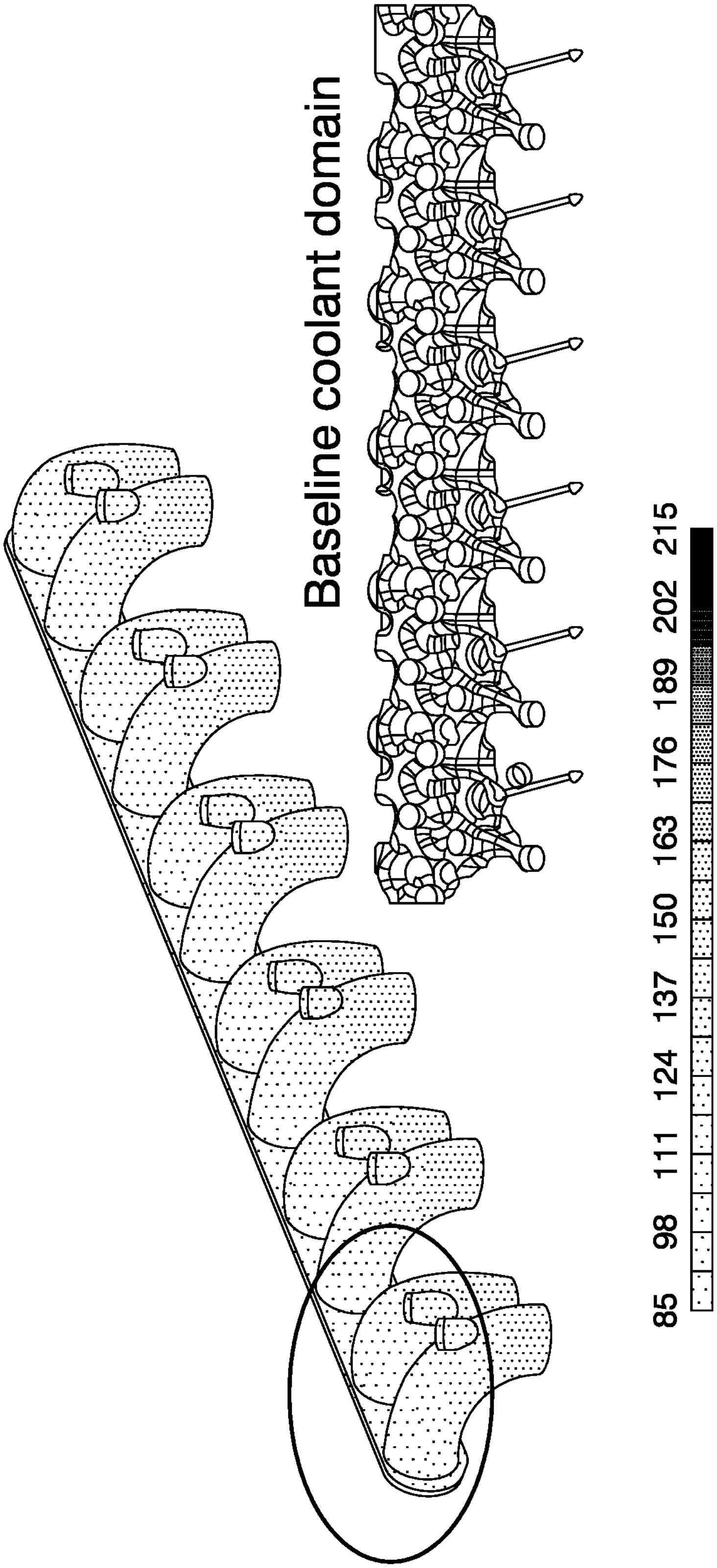
FIGS. 15A and 15B are diagrams comparing coolant domains and relative temperatures in the areas of intake ports of the related art and an embodiment in accord with the present disclosure.
Figure 15B:
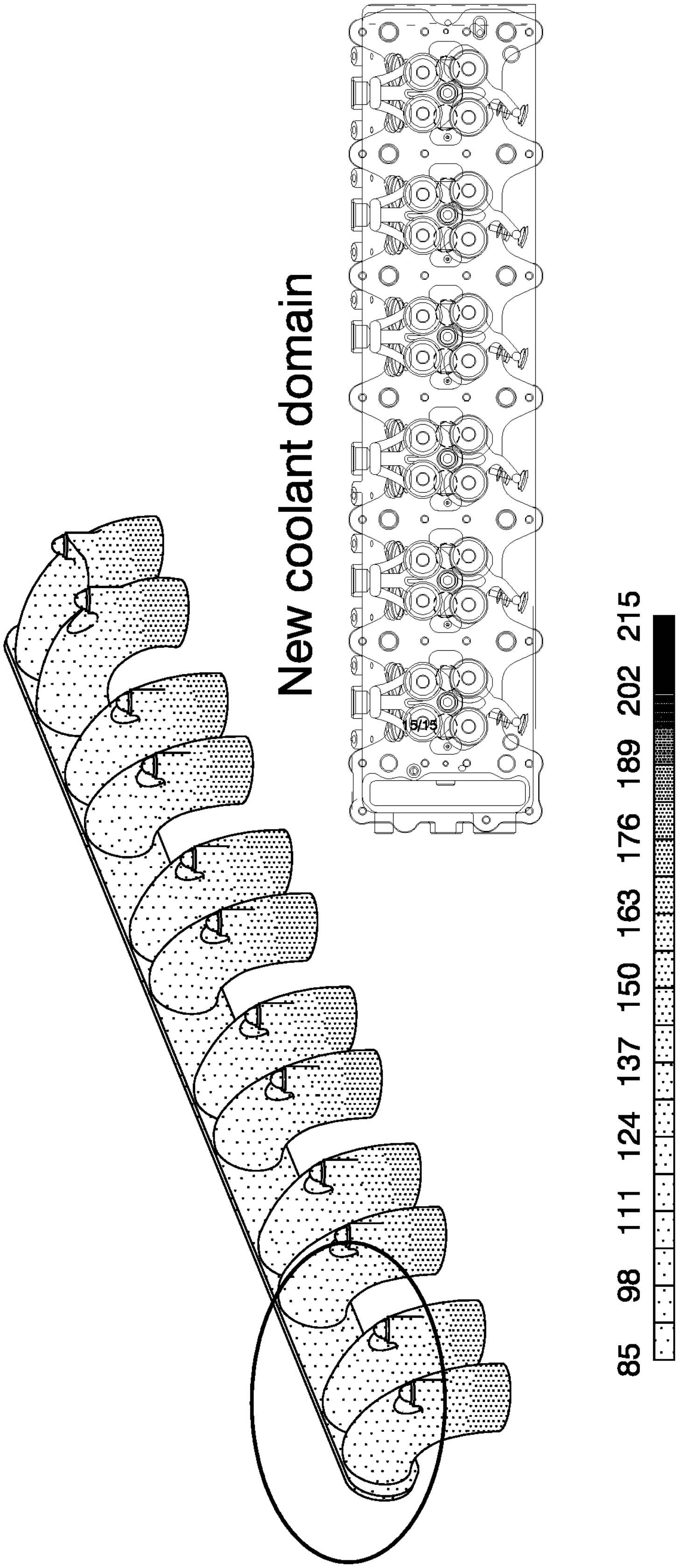

FIGS. 15A and 15B are diagrams comparing coolant domain and relative temperatures in the areas of intake ports of the related art to coolant domain and relative temperatures in the areas of intake ports of an embodiment in accord with the present disclosure. The related art depiction in FIG. 15A of intake ports with shaded temperature gradients shows the relatively higher temperatures resulting in the intake ports of related art heads. This is contrasted with the lower temperatures achieved by using the head configuration according to embodiments of the present disclosure, illustrated in shaded temperature gradients shown on the intake ports (see intake passage 414) represented in FIG. 15B. The related art depiction in FIG. 15A of the coolant domain of head shown shows a series coolant flow system. This domain design is contrasted with the FIG. 15B parallel flow configuration of the jacket 900 according to embodiments of the present disclosure.

A method is provided for manufacturing a head 100 according to any of the embodiments described herein and depicted in one or more of the drawing figures. The method comprises forming a cylinder head using additive manufacturing to configure the head to minimize head weight. The inventors discovered improvements in configuration of cylinder heads using a lean integrative approach to develop the structure. These improved configurations allow the proper and efficient transfer of bolt compression loads to the most important sealing areas—the combustion seals and the external sealing surfaces. The configurations also improve desired transfer or conservation of energy in different zones of the head to improve efficiency of engine operation, reduce wear, reduce exhaust emissions, and improve combustion characteristics.

Among the improved configurations of the head 100 are the pyramidal-shaped cavity 500 being connected via an oil passage 510 to the first boss cutout 418, permitting fluid connection to allow for drain of oil between the central cavity 500 and the first boss cutout 418, as depicted in FIGS. 5-6 and 8. The cores are designed with two principal undercutting features that are improved over prior art: the first is an undercut in the center of the head between two respective combustion chamber areas, best seen as the cavity 500 shown in FIG. 7. The center section cavity 500 features a diamond shape specifically designed to eliminate as much unneeded iron as possible while maintaining important structural rigidity across major loading areas (between head bolts and valve guides, and across head bolts). Another improved undercutting feature is providing one or more undercuts (cutouts) below an underhead bearing area of a head bolt 410, best seen as first boss cutout 418 in FIG. 7, and in another example, second boss cutout 600 depicted by the core form in FIG. 6. These underhead cutout features allow the proper and efficient transfer of bolt compression loads to the most important sealing areas—the combustion seals and the external sealing surfaces. Typical heads will fill these cavities with coolant, thereby adding weight and unnecessary heat transfer areas in the head. In an embodiment, the improved head does not have these cavities filled with coolant, and instead has these cavities filled with air.

In an example, the improved core configurations of embodiments herein may enable a six (6) kilogram weight reduction as compared to a baseline prior art head. Beneficial features of the described core pack are: a large center core (e.g., cavity 500) between cylinders which removes weight, enables oil to drain from the valve train to the engine block, and has large undercutting geometry; intake and exhaust undercut cores for the cap screws, which direct the clamping force of the cylinder head bolts to the combustion seal, a key loading location on the head. The cores also remove weight that does not serve any structural support.

Cyclical combustion forces repeatedly push the cylinder head away from the block. The inventors discovered configurations for effective management of structural members, along with the guidance of compressive bolt forces that are paramount to maintaining stiffness of the head and maintaining sealing integrity between the head and the block. The inventors employed topology optimization as a guiding framework to develop a lean structural framework of beams that connect the cylinder head bolt bores down the length of the head, across the head, and diagonally through the injector bore. Effective management of casting cores, through the use of undercutting geometry, allow the designer to guide the compressive bolt forces to critical sealing interfaces: 1. the combustion seal, and 2. the exterior sealing surface of the cylinder head (see FIG. 8). This disclosure has improved upon prior art by incorporating these features into a slab cylinder head in which the cylinder head bolts must share loading amongst adjacent cylinders, as contrasted with unit head designs known in the prior art. The present disclosure fully encapsulates the bolts from the environment, thus helping to prevent corrosion and damage to the bolt threads.

Among the improved configurations are the coolant jacket according to the present disclosure. The embodiments herein improve on prior designs by keeping "the hot side hot, and the cold side cold." This lean jacket design maintains combustion face temperatures for iron life, improves hot and cold temperature transfers to the exhaust gas and intake charge air, respectively, and has the weight benefits of being approximately 5 L lower in coolant volume without loss of temperature maintenance efficacy. The hot side is kept hotter than in baseline prior configurations, which reduces heat transfer from exhaust gas, thereby improving turbo efficiency and heat available for aftertreatment/waste heat recovery. Cold side intake port temperatures are cooler than the baseline prior configurations, which reduces the heat transfer to the charge air, thereby improving volumetric efficiency of the engine.

Among the improved configurations is providing a coolant jacket wherein at least one of the intake valves has a wet seat (that is, coolant is provided in the vicinity of the valve seat). This cools the hottest parts of the intake ports (seat and valves) and helps keep the exhaust side temperatures in check. This wet seat intake valve configuration optionally may be combined with embodiments as shown wherein at least one of the exhaust valves also has a wet seat. The bottom of the poppet valves are the hottest parts of the combustion deck. Heat transfer from the poppet valves is threefold: to the intake gas; through the valve seats; and through the valve guides. The configuration of the present disclosure provides wet intake seats serving two purposes: the configuration enables better poppet valve head cooling, thus producing cooler head temperatures; and arrests the combustion heat flux from propagating through the iron (fire deck) to the intake ports, producing lower intake port temperatures overall. Wet exhaust seats prevent overheating the exhaust valve and seat.

Among the improved configurations is providing a coolant jacket having a coolant bridge between intake and exhaust ports (I-E bridge coolant passage). This feature arrests the exhaust temperature from propagating through the iron (I-E bridge) to the intake ports, producing lower intake port temperatures overall. Another improved feature is that this design of the jacket and wet seats enables positive coolant flow through each of the bridge wings.

Among the improved configurations is providing a coolant jacket having a "lean" jacket design as contrasted with prior art saturated jacket design. Embodiments described herein provide the benefits of positioning coolant in only the locations where it is absolutely needed, as contrasted with prior art heads that saturate open cavities with coolant flow. For intake charge air reheating, the benefits of the lean water jacket design of the disclosed embodiments are more prominent at higher coolant temperatures. Intake ports saturated and surrounded by more coolant than is necessary may increase the bulk charge air temperature. In the designs herein, coolant exits the head after cooling each cylinder independently (six locations in a six-cylinder engine), rather than in one location. This prevents having to run coolant to one exit location—where coolant has to move through more passages and be exposed to more cylinder head surface area, and accordingly, to more heat.

In embodiments of the invention, water jacket cores are configured for "parallel flow" across the cylinder head from side to side, to maximize the cylinder to cylinder temperature uniformity. This is contrasted with prior designs employing serial cooling down the length (in a direction along a longitudinal axis X) of the head. An additional benefit to the disclosed lean jacket is that it works even more efficiently with hotter coolant temperatures (+90 degrees C.), shown at 130 degrees C. in FIGS. 15A and 15B) over the baseline designs (this is because the water jacket is lean, and there is not much "hot" coolant around/on top of the intake port walls). Increased water temperature will drive higher oil temperatures for lower friction in the engine, and will result in less heat transfer in-cylinder due to higher wall temperatures for better thermal efficiency. The intake ports according to embodiments of this disclosure have a lower average port temperature when compared to baseline at higher coolant temperatures. This is because of the lean water jacket design without the need for an upper jacket.

Among the improved configurations are the positioning of the exhaust gas outlet in a recess 116 of the exhaust side wall 112 according to the present disclosure. The embodiments herein thus improve on prior designs by shortening the length of the exhaust gas port in the head (see FIGS. 15A and 15B). In disclosed embodiments, the configuration that includes recesses 116 formed in the exhaust side wall 112 may optionally include use of a jumper tube 404 outside the head to span the distance between exhaust manifold and the exhaust gas outlet of the head. Employing this embodiment, exhaust gas energy (heat) is conserved by significantly reducing the amount of iron area that the hot exhaust gas touches. The iron must be cooled to appropriate temperatures. Therefore, more port area means more area of iron that must be cooled by water, and subsequently more heat transfer from the exhaust, robbing the gas of energy that could be used by the turbo.

In embodiments of the invention, the exhaust ports end immediately after the valve guide, and a jumper tube is inserted which spans the distance between the head exhaust gas port and exhaust manifold port. This configuration also reduces the heating of intake charge. Intake charge temperature @ IVC expected to be comparable to ~2K lower. The embodiments herein may be combined with construction of the head using improved formulations of ductile iron, and/or thermal barrier coatings to further reduce reheating of intake air. In an example application, the configurations of the exhaust port with jumper tube may maintain exhaust temperatures by +11K/cylinder. In an example configuration according to embodiments herein, the exhaust port area=11322 $mm^2$ (in a 59% reduction from a prior art configuration @ 27806 $mm^2$); Cylinder Head Mass=118 KG (5% reduction from a prior art configuration @ 124 KG); Coolant Volume=1 L (82% reduction from a prior art configuration @ 5.6 L); wet intake and exhaust seats were employed; equivalent combustion face temperatures to a prior art configuration were employed; and implemented a square valve pattern (as contrasted with a diamond valve pattern).

A configuration of the jumper tube herein may comprise a double seal construction that enables six degrees of freedom to compensate for part to part variation; assembly misalignment; and thermal growth.

In embodiments disclosed herein, the invention comprises a cylinder head of an internal combustion engine, the cylinder head being configured to cover a plurality of combustion chambers of the engine, and comprising at least one fastener boss configured for receiving insertion of a fastener that, in an engaged condition, fastens the cylinder head to a cylinder block of the engine, a bottom deck side of the cylinder head disposed near the cylinder block in the engaged condition, and a boss cutout formed in the fastener boss on the bottom deck side, wherein the boss cutout defines a portion of a wall of a sealed cavity that surrounds a shank portion of the fastener positioned in the boss cutout in the engaged condition. In one example of an embodiment, the sealed cavity contains air.

In embodiments disclosed herein, the invention comprises a cylinder head of an internal combustion engine configured to cover a plurality of combustion chambers of the engine, comprising a plurality of fastener bosses configured for receiving insertion of fasteners that, in an engaged condition, fasten the cylinder head to a cylinder block of the engine, and a bottom deck side of the cylinder head disposed near the cylinder block in the engaged condition, wherein at least two bosses disposed between two adjacent combustion chambers in an engaged condition comprise boss cutouts formed on the bottom deck side of the two bosses such that a contact pressure balance of sealing forces is shared between fasteners inserted in the two bosses.

In an example of an embodiment, in the cylinder head, at least one of the boss cutouts defines a portion of a wall of a sealed cavity that surrounds a shank portion of the fastener positioned in the boss cutout in the engaged condition.

In embodiments disclosed herein, the invention comprises a cylinder head of an internal combustion engine configured to cover at least two adjacent combustion chambers of the engine, each of the chambers having an intake valve and an exhaust valve positioned on its side near the adjacent chamber, comprising: an outer enclosure; a plurality of fastener bosses, each boss being configured for receiving insertion of a fastener that, in an engaged condition, fastens a bottom deck side of the cylinder head to a cylinder block of the engine; and a cavity formed within the outer enclosure, the cavity being formed generally in a shape of an inverted pyramid having a parallelogram-shaped upper face defining an upper wall of the cavity, and an apex pointing toward the bottom deck side of the cylinder head, wherein a central portion of the upper face of the pyramid is disposed at a position equidistant from centerpoints of each of the valves disposed between the two adjacent chambers. In an example of an embodiment, the pyramid comprises at least one rounded corner. In an example of an embodiment, the pyramid comprises at least one non-planar portion of a face of the pyramid.

In an example of an embodiment, the cylinder head comprises a beam formation disposed above the upper wall of the cavity, and disposed between two fastener bosses of the head positioned between two adjacent combustion chambers, such that the beam reinforces a head portion positioned between the two fastener bosses. In an example of an embodiment, the cylinder head further comprises a boss cutout formed in the fastener boss on the bottom deck side, wherein the boss cutout is fluidly connected to the cavity to permit passage of oil between the boss cutout and the cavity.

In an embodiments disclosed herein, the invention comprises a cylinder head of an internal combustion engine, comprising: an exhaust valve seat configured to engage an exhaust valve of a combustion chamber of the engine and an intake valve seat configured to engage an intake valve of the same combustion chamber; and a coolant jacket formed in the cylinder head, the coolant jacket comprising a coolant outlet disposed on an exhaust side of the cylinder head, a first coolant inlet disposed on an exhaust side of the cylinder head and a second coolant inlet disposed on an intake side of the cylinder head, an annular exhaust valve seat coolant passage extending along a circumference of the exhaust valve seat, and an annular intake valve seat coolant passage extending along a circumference of the intake valve seat, wherein the coolant outlet, the first and second coolant inlets, the exhaust valve seat coolant passage, and the intake valve seat coolant passage are fluidly coupled.

In an example of an embodiment, the cylinder head further comprises an intake-exhaust bridge coolant passage disposed proximate to an intake-exhaust bridge of the cylinder, and fluidly connected to the coolant outlet and the first and second coolant inlets. In an example of an embodiment, the coolant jacket further comprises an annular fuel injector coolant passage extending along a circumference of a seat or bore 102 that is formed in the head for receiving insertion of a fuel injector.

In embodiments disclosed herein, the invention comprises a cylinder head of an internal combustion engine configured to cover a plurality of combustion chambers of the engine, comprising: an outer enclosure and an exhaust gas outlet, wherein the outer enclosure comprises a depressed area in an exhaust side wall of the head, and the depressed area is positioned adjacent to the exhaust gas outlet such that the exhaust gas outlet is disposed adjacent to an exhaust valve guide formed in the cylinder head. In an example of an embodiment, an internal combustion engine comprises a cylinder head according to embodiments above, and further comprises a jumper tube fluidly coupled to the exhaust gas outlet and to an exhaust manifold of the engine.

In embodiments disclosed herein, the invention comprises a cylinder head according to any of the embodiments or examples above, in any combination of features recited herein. In embodiments disclosed herein, the invention comprises a method for forming a cylinder head according to any of the embodiments or examples above, in any combination of features recited herein, using additive manufacturing to configure the head.

One of skill in the art may appreciate from the foregoing that unexpected benefits are derived from application of the method, system, and apparatus to the problem of optimizing operation of an engine system, by reducing the weight of a cylinder head, by reducing the amount of metal required to form a cylinder head without reducing strength and stability, by improving temperature control in regions of a cylinder head, and/or by reducing the amount of coolant required to maintain favorable temperature conditions in a cylinder head. An unexpected benefit may be derived from application of the disclosed method, system, and apparatus without the need for including or adding additional components or parts, and/or without changing conventional features of the configuration of a conventional vehicle. Changes to configuration of a conventional engine system may add costs, weight, and complexity to manufacture, operation, and maintenance of the engine system. A key benefit contemplated by the inventors is improvement of cylinder head features and operations in a conventional engine system through use of the disclosed system, method, or apparatus, while excluding any additional components, steps, or change in structural features. In this exclusion, maximum cost containment may be effected. Accordingly, the substantial benefits of simplicity of manufacture, operation, and maintenance of standard or conventionally produced vehicles as to which the method and system may be applied may reside in an embodiment of the invention consisting of, or consisting essentially of, features of the method, system, or apparatus disclosed herein. Thus, embodiments of the invention contemplate the exclusion of steps, features, parts, and components beyond those set forth herein. The inventors contemplate, in some embodiments, the exclusion of certain steps, features, parts, and components that are set forth in this disclosure even when such are identified as being included, preferred, and/or preferable.

It is to be understood that the above description is intended to be illustrative, and not restrictive. Many other embodiments will be apparent to those of skill in the art upon reading and understanding the above description. For example, it is contemplated that features described in association with one embodiment are optionally employed in addition or as an alternative to features described in association with another embodiment. The scope of the invention should, therefore, be determined with reference to the appended claims, along with the full scope of equivalents to which such claims are entitled.

The invention claimed is:

1. A cylinder head of an internal combustion engine, the cylinder head being configured to cover a plurality of combustion chambers of the engine, and comprising:

at least one fastener boss configured for receiving insertion of a fastener that, in an engaged condition, fastens the cylinder head to a cylinder block of the engine;

a bottom deck side of the cylinder head disposed near the cylinder block in the engaged condition; and a boss cutout formed in the fastener boss on the bottom deck side, wherein the boss cutout defines a portion of a wall of a sealed cavity that surrounds a shank portion of the fastener positioned in the boss cutout in the engaged condition.

2. The cylinder head of claim 1, wherein the sealed cavity contains air.

3. A cylinder head of an internal combustion engine configured to cover a plurality of combustion chambers of the engine, comprising:

a plurality of fastener bosses configured for receiving insertion of fasteners that, in an engaged condition, fasten the cylinder head to a cylinder block of the engine; and a bottom deck side of the cylinder head disposed near the cylinder block in the engaged condition, wherein at least two bosses disposed between two adjacent combustion chambers in an engaged condition comprise boss cutouts formed on the bottom deck side of the two bosses such that a contact pressure balance of sealing forces is shared between fasteners inserted in the two bosses.

4. The cylinder head of claim 3, wherein at least one of the boss cutouts defines a portion of a wall of a sealed cavity that surrounds a shank portion of the fastener positioned in the boss cutout in the engaged condition.

5. A cylinder head of an internal combustion engine configured to cover at least two adjacent combustion chambers of the engine, each of the chambers having an intake valve and an exhaust valve positioned on its side near the adjacent chamber, comprising:

an outer enclosure;

a plurality of fastener bosses, each boss being configured for receiving insertion of a fastener that, in an engaged condition, fastens a bottom deck side of the cylinder head to a cylinder block of the engine; and a cavity formed within the outer enclosure, the cavity being formed generally in a shape of an inverted pyramid having a parallelogram-shaped upper face defining an upper wall of the cavity, and an apex pointing toward the bottom deck side of the cylinder head, wherein a central portion of the upper face of the pyramid is disposed at a position equidistant from centerpoints of each of the valves disposed between the two adjacent chambers.

6. The cylinder head according to claim 5, wherein the pyramid comprises at least one rounded corner.

7. The cylinder head according to claim 5, wherein the pyramid comprises at least one non-planar portion of a face of the pyramid.

8. The cylinder head according to claim 5, wherein the head comprises a beam formation disposed above the upper wall of the cavity, and disposed between two fastener bosses of the head positioned between two adjacent combustion chambers, such that the beam reinforces a head portion positioned between the two fastener bosses.

9. The cylinder head according to claim 5, further comprising a boss cutout formed in the fastener boss on the bottom deck side, wherein the boss cutout is fluidly connected to the cavity to permit passage of oil between the boss cutout and the cavity.

10. A cylinder head of an internal combustion engine, comprising:

an exhaust valve seat configured to engage an exhaust valve of a combustion chamber of the engine and an intake valve seat configured to engage an intake valve of the same combustion chamber; and a coolant jacket formed in the cylinder head, the coolant jacket comprising a coolant outlet disposed on an exhaust side of the cylinder head;

a first coolant inlet disposed on an exhaust side of the cylinder head and a second coolant inlet disposed on an intake side of the cylinder head;

an annular exhaust valve seat coolant passage extending along a circumference of the exhaust valve seat; and an annular intake valve seat coolant passage extending along a circumference of the intake valve seat, wherein the coolant outlet, the first and second coolant inlets, the exhaust valve seat coolant passage, and the intake valve seat coolant passage are fluidly coupled.

11. The cylinder head of claim 10, further comprising an intake-exhaust bridge coolant passage disposed proximate to an intake-exhaust bridge of the cylinder, and fluidly connected to the coolant outlet and the first and second coolant inlets.

12. The cylinder head of claim 10, wherein the coolant jacket further comprises an annular fuel injector coolant passage extending along a circumference of a seat formed in the head for a fuel injector.

13. A cylinder head of an internal combustion engine configured to cover a plurality of combustion chambers of the engine, comprising:

an outer enclosure and an exhaust gas outlet, wherein the outer enclosure comprises a depressed area in an exhaust side wall of the head, and the depressed area is positioned adjacent to the exhaust gas outlet such that the exhaust gas outlet is disposed adjacent to an exhaust valve guide formed in the cylinder head.

14. An internal combustion engine comprising a cylinder head according to claim 13, and further comprising a jumper tube fluidly coupled to the exhaust gas outlet and to an exhaust manifold of the engine.

15. The cylinder head of claim 10, wherein the first coolant inlet is configured to receive intake of a larger portion of coolant for circulation through the coolant jacket and the second coolant inlet is configured to receive intake of a smaller portion of coolant for circulation through the coolant jacket;

wherein the annular exhaust valve seat coolant passage is fluidly coupled with the first coolant inlet, wherein the annular intake valve seat coolant passage is fluidly coupled with the second coolant inlet, and further wherein the coolant outlet, the first and second coolant inlets, the exhaust valve seat coolant passage, and the intake valve seat coolant passage are fluidly coupled through the coolant outlet.

16. The cylinder head of claim 15, wherein the coolant jacket further comprises an exhaust side passage positioned between and fluidly coupled with the first coolant inlet and the annular exhaust valve seat coolant passage.

17. The cylinder head of claim 15, wherein the coolant jacket further comprises an exit passage positioned between the annular exhaust valve seat coolant passage and the coolant outlet.

18. The cylinder head of claim 15, wherein the exhaust side passage further comprises a second exhaust side passage and the annular exhaust valve seat coolant passage comprises a second annular exhaust valve seat coolant passage, wherein the two exhaust side passages are each connected to one of the two annular exhaust valve seat coolant passages.

19. The cylinder head of claim 15, wherein the coolant jacket further comprises a connector passage fluidly coupled with the annular fuel injector coolant passage and the coolant outlet.

20. The cylinder head of claim 15, wherein the larger portion of coolant for circulation through the coolant jacket is about 80% of an incoming coolant and the smaller portion of coolant is about 20% of the incoming coolant.

* * * * *